US012130152B2

(12) United States Patent
Gupta et al.

(10) Patent No.: US 12,130,152 B2
(45) Date of Patent: Oct. 29, 2024

(54) SYSTEM FOR OFFSITE NAVIGATION

(71) Applicant: Schlumberger Technology Corporation, Sugar Land, TX (US)

(72) Inventors: Soumya Gupta, Menlo Park, CA (US); John Z. Pang, Menlo Park, CA (US); Andrey Konchenko, Menlo Park, CA (US); Erik Burton, Menlo Park, CA (US); Mugdha Bhusari, Menlo Park, CA (US); Jose R. Celaya Galvan, Menlo Park, CA (US); Ivan Joel Alaniz, McAllen, TX (US); Crispin Chatar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 181 days.

(21) Appl. No.: 17/535,236

(22) Filed: Nov. 24, 2021

(65) Prior Publication Data
US 2022/0157167 A1 May 19, 2022

Related U.S. Application Data

(63) Continuation-in-part of application No. 16/878,524, filed on May 19, 2020, now Pat. No. 11,598,639.
(Continued)

(51) Int. Cl.
*G01C 21/36* (2006.01)
*G01C 21/00* (2006.01)
(Continued)

(52) U.S. Cl.
CPC ......... *G01C 21/3697* (2013.01); *G01C 21/32* (2013.01); *G01C 21/3407* (2013.01); *G01C 21/3446* (2013.01); *G01C 21/3852* (2020.08)

(58) Field of Classification Search
CPC ...... G08G 1/00; G01C 21/00; G01C 21/3697; G01C 21/32; G01C 21/3407; G01C 21/3446; G01C 21/3852
(Continued)

(56) References Cited

U.S. PATENT DOCUMENTS 6,456,933 B1 9/2002 Hessing
7,043,357 B1 5/2006 Stankoulov et al.
(Continued)

OTHER PUBLICATIONS

"Graph Optimization with NetworkX in Python", 2017, downloaded from the internet on Aug. 2, 2024 from [https://www.datacamp.com/community/tutorials/networkx-python-graph-tutorial], 32 pages. (Year: 2017).*
(Continued)

*Primary Examiner* — Rami Khatib
*Assistant Examiner* — Paul Allen
(74) *Attorney, Agent, or Firm* — Jeffrey D. Frantz

(57) ABSTRACT

A method including generating, by a navigation service, a route for navigating from a route origin to a route destination using a private roads repository. The method includes identifying a ghost origin and a ghost destination of a ghost road along the route. The method includes sending, using an application programming interface of a base roads engine, a first request for a route from the ghost origin to the ghost destination. The method includes receiving, from the base roads engine in response to the first request, a replacement section from the ghost origin to the ghost destination. The method includes replacing, in the route, the ghost road with the replacement section to create an updated route including segments. The method includes generating an estimated travel time from the route origin to the route destination over the segments of the updated route. The method includes presenting the estimated travel time.

19 Claims, 14 Drawing Sheets

Related U.S. Application Data

(60) Provisional application No. 62/850,482, filed on May 20, 2019.

(51) Int. Cl.
  *G01C 21/32* (2006.01)
  *G01C 21/34* (2006.01)

(58) Field of Classification Search
  USPC .................................................. 701/400–541
  See application file for complete search history.

(56) References Cited

U.S. PATENT DOCUMENTS

| | | | |
|---|---|---|---|
| 7,433,889 B1 * | 10/2008 | Barton | ................. G08G 1/0104 |
| 8,531,312 B2 | 9/2013 | Gueziec | |
| 8,600,098 B2 | 12/2013 | Sampedro Diaz et al. | |
| 8,612,136 B2 | 12/2013 | Levine et al. | |
| 2001/0002454 A1 | 5/2001 | Narumi et al. | |
| 2008/0071471 A1 | 3/2008 | Sumizawa et al. | |
| 2008/0201070 A1 | 8/2008 | Kikuchi | |
| 2009/0048776 A1 | 2/2009 | Bouillet et al. | |
| 2011/0153190 A1 | 6/2011 | Rolinski et al. | |
| 2013/0204528 A1 | 8/2013 | Okude et al. | |
| 2014/0143251 A1 * | 5/2014 | Wang | .................... G06F 16/285 |
| | | | 707/737 |
| 2014/0257697 A1 | 9/2014 | Gishen | |
| 2015/0106010 A1 | 4/2015 | Martin et al. | |
| 2015/0179069 A1 | 6/2015 | Cazanas et al. | |
| 2015/0253142 A1 | 9/2015 | Kornhauser et al. | |
| 2016/0146617 A1 | 5/2016 | MacFarlane | |
| 2016/0161263 A1 | 6/2016 | Patel | |
| 2016/0202074 A1 * | 7/2016 | Woodard | ............. G06Q 10/047 |
| | | | 701/465 |
| 2017/0277578 A1 | 9/2017 | Greenwood et al. | |
| 2018/0032926 A1 * | 2/2018 | DeLuca | ................ G06Q 10/025 |
| 2018/0087917 A1 | 3/2018 | Adachi et al. | |
| 2018/0188063 A1 | 7/2018 | Thommen et al. | |
| 2018/0224293 A1 * | 8/2018 | Xu | .......................... G01C 21/30 |
| 2019/0016341 A1 | 1/2019 | Nelson | |
| 2019/0180612 A1 | 6/2019 | Demiryurek et al. | |
| 2019/0234743 A1 | 8/2019 | Roy et al. | |
| 2020/0284594 A1 * | 9/2020 | Wang | ................... G08G 1/0112 |
| 2020/0292344 A1 | 9/2020 | Hori et al. | |
| 2020/0318979 A1 | 10/2020 | Gonopolskiy et al. | |
| 2020/0327707 A1 | 10/2020 | Furger et al. | |
| 2020/0370901 A1 | 11/2020 | Konchenko et al. | |

OTHER PUBLICATIONS

Office Action issued in U.S. Appl. No. 16/878,524 dated Jul. 7, 2021, 38 pages.

Office Action issued in U.S. Appl. No. 16/878,524 dated Jan. 19, 2022, 49 pages.

Office Action issued in U.S. Appl. No. 16/878,524 dated Jun. 10, 2022, 13 pages.

Search Report and Written Opinion of International Patent Application No. PCT/US2022/050178 dated Apr. 17, 2023, 9 pages.

* cited by examiner

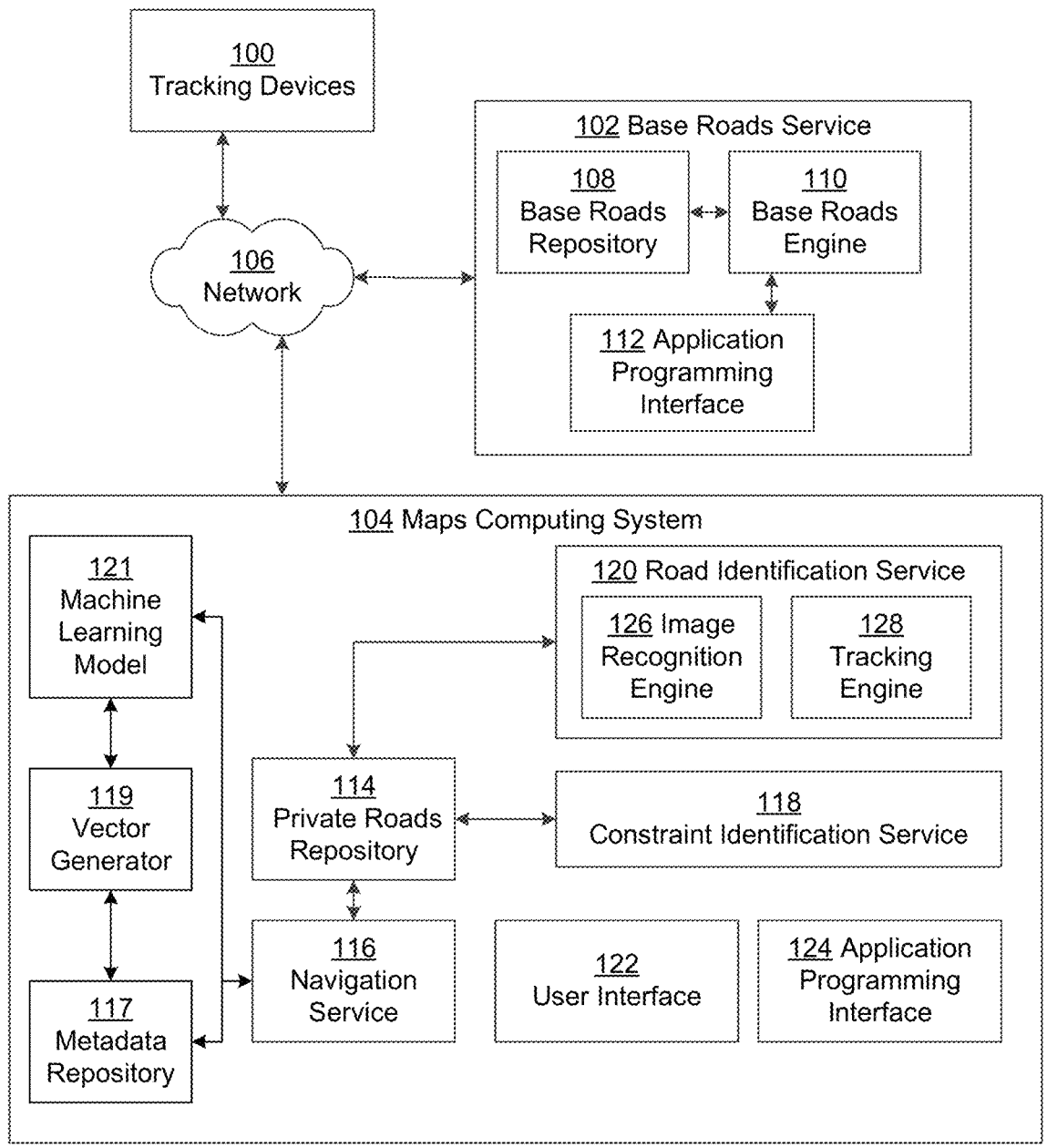
FIG. 1.1

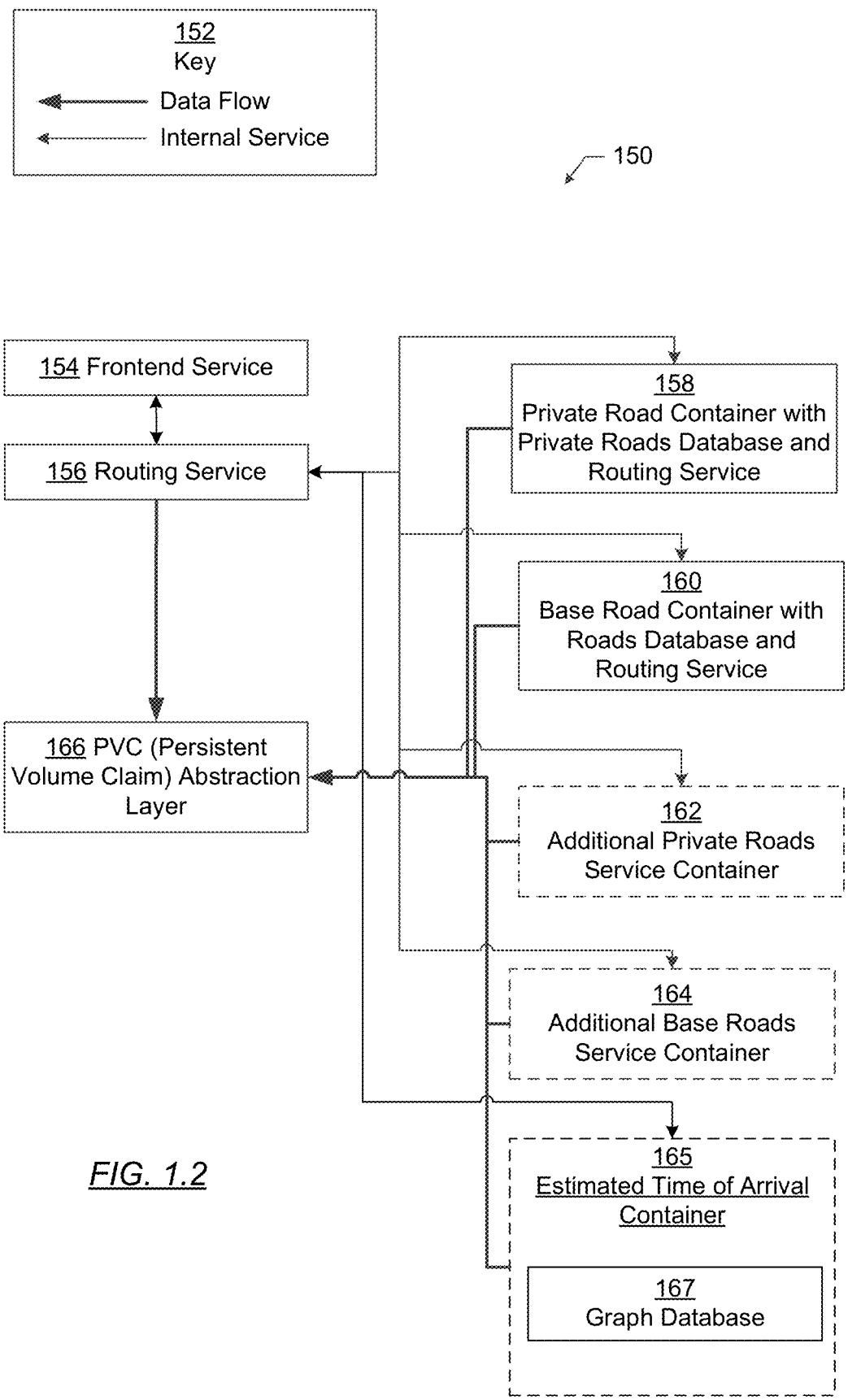
FIG. 1.2

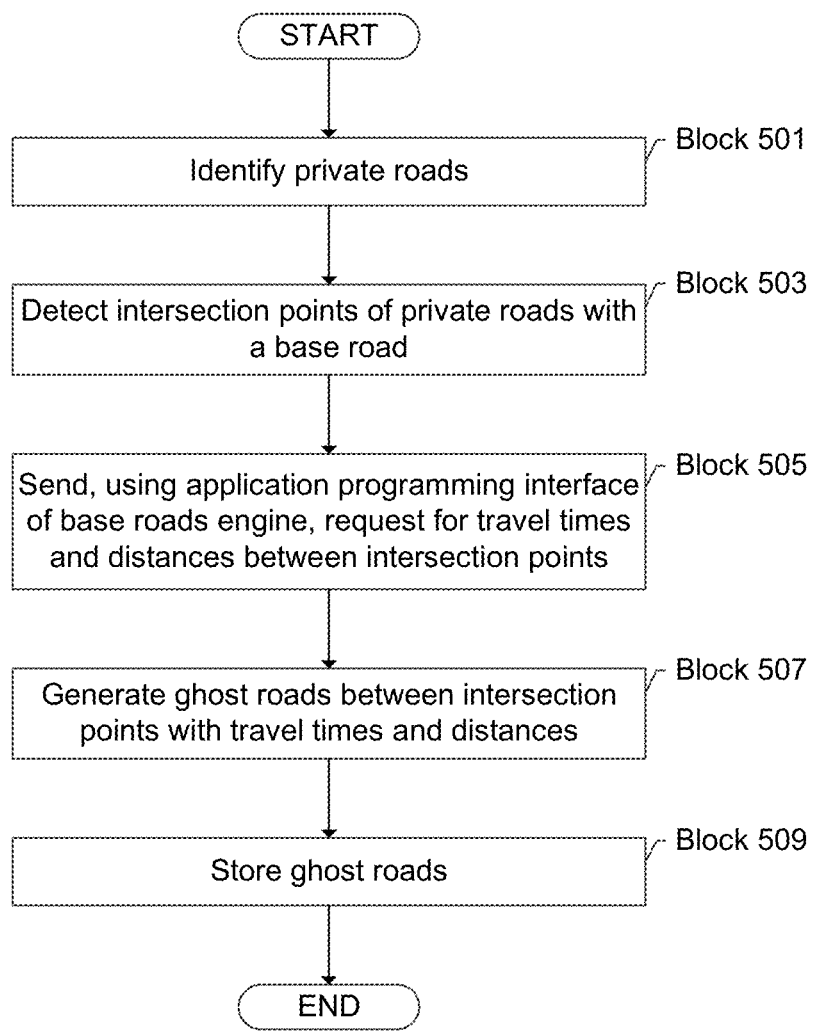
FIG. 5.1

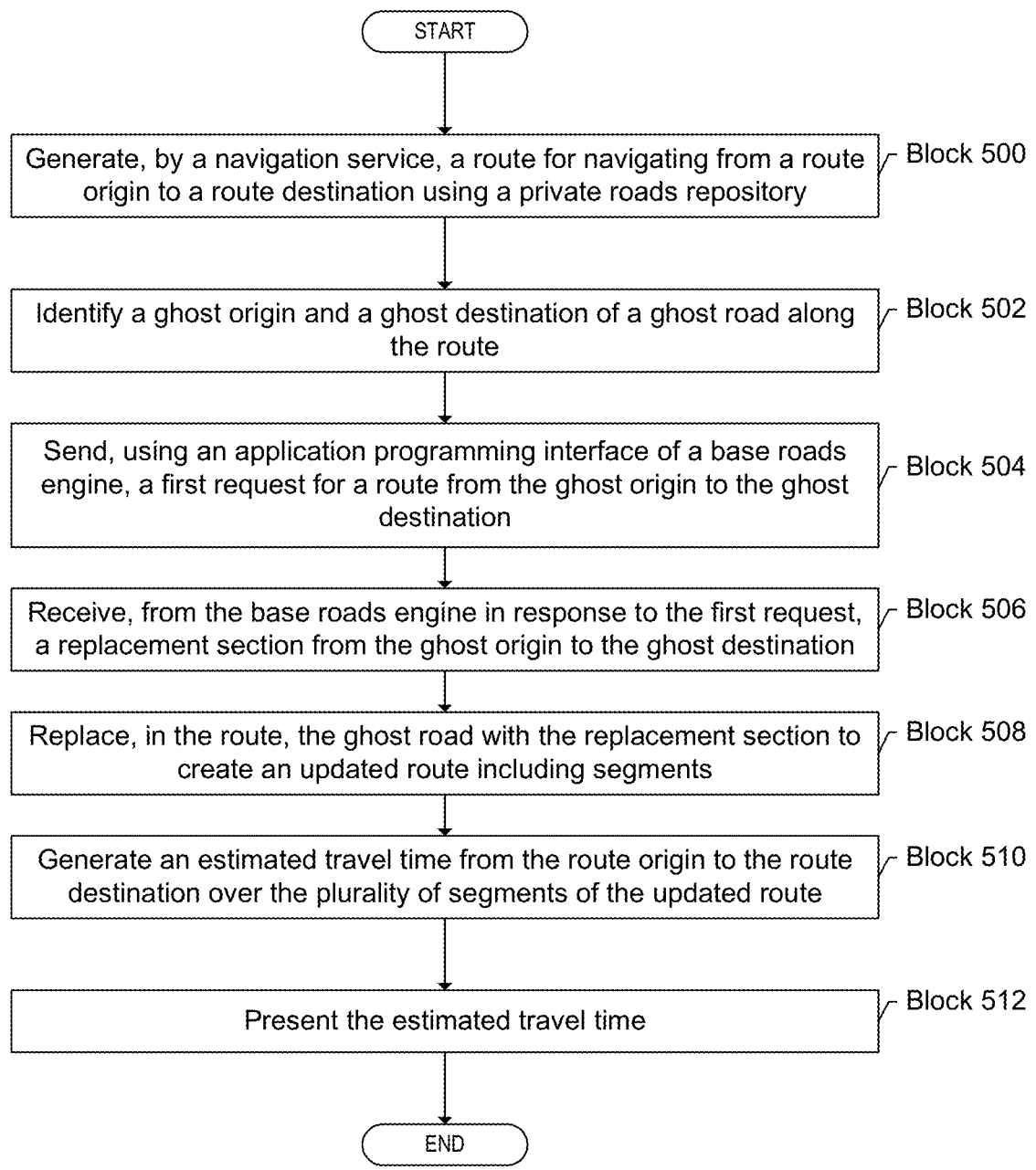
FIG. 5.2

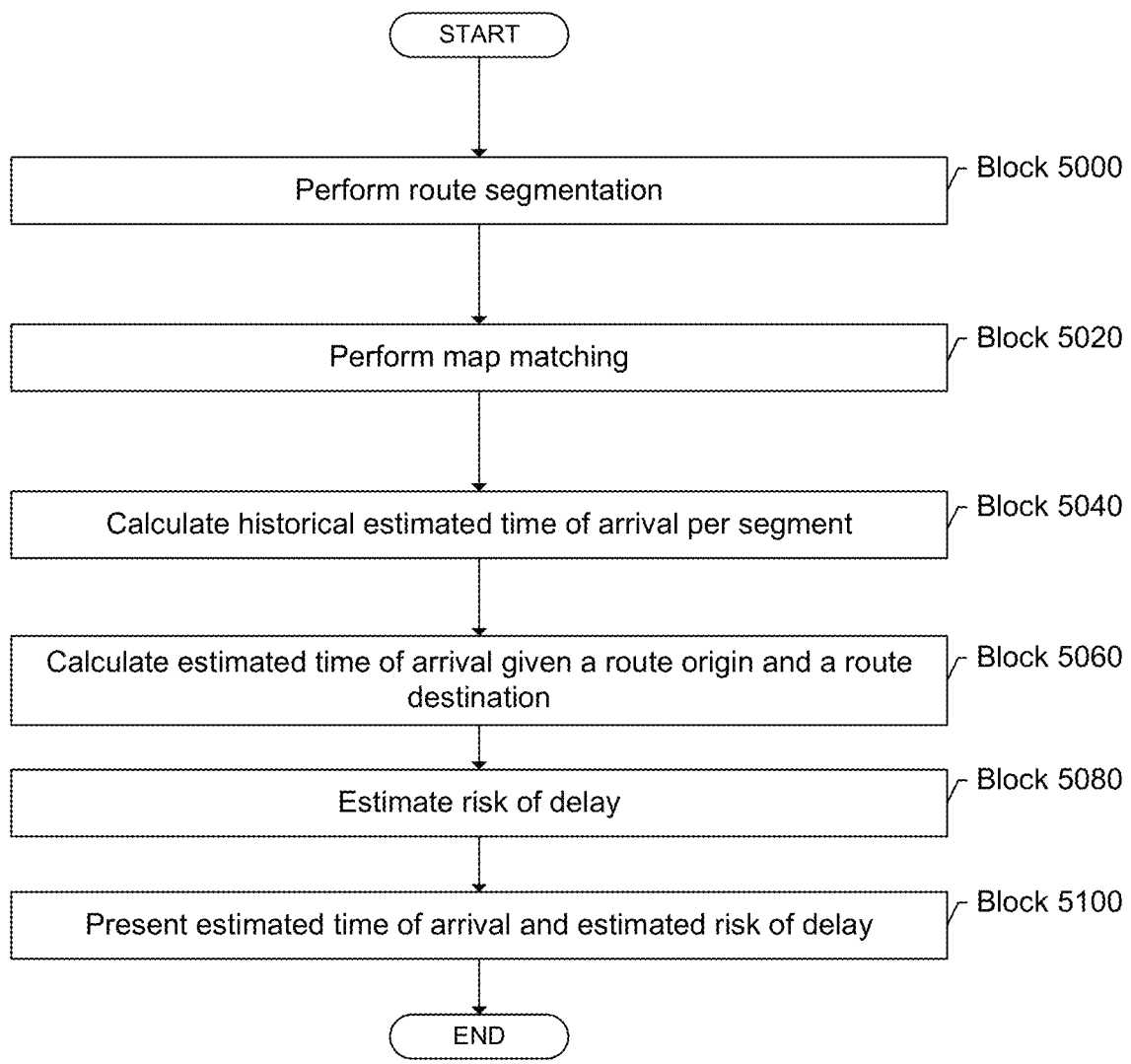
FIG. 5.3

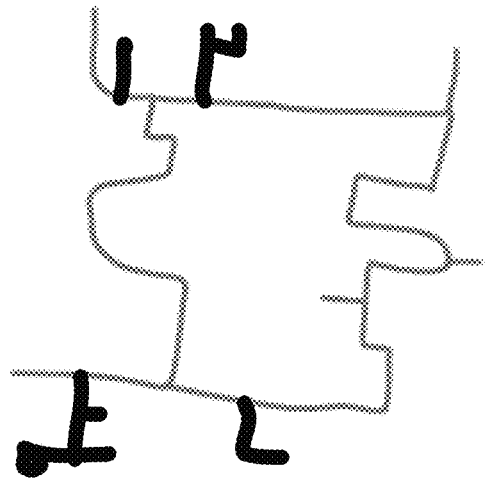
*FIG. 6.1*
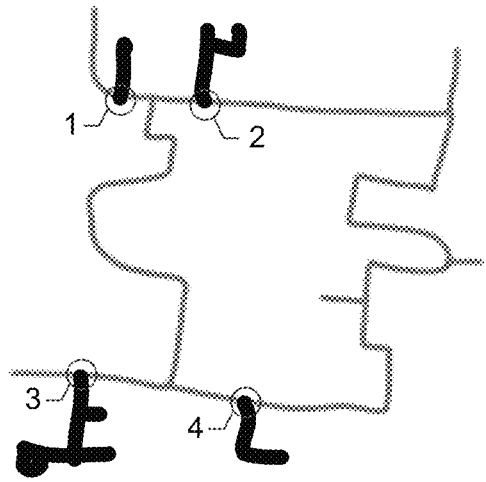
*FIG. 6.2*
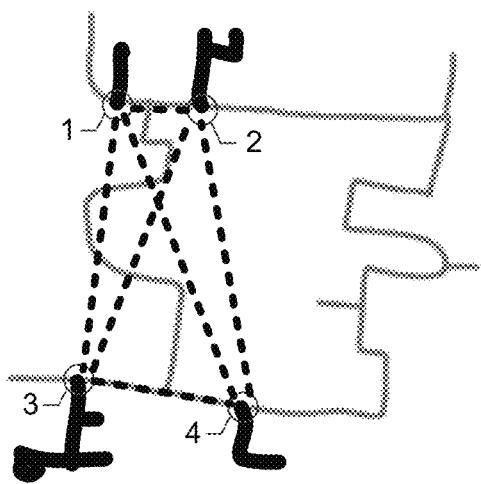
*FIG. 6.3*
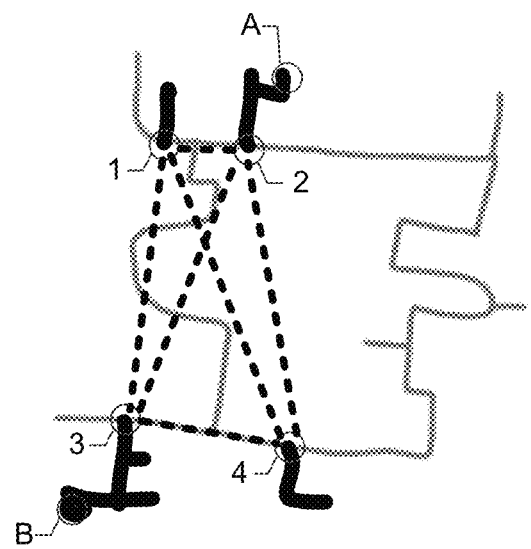
*FIG. 6.4*

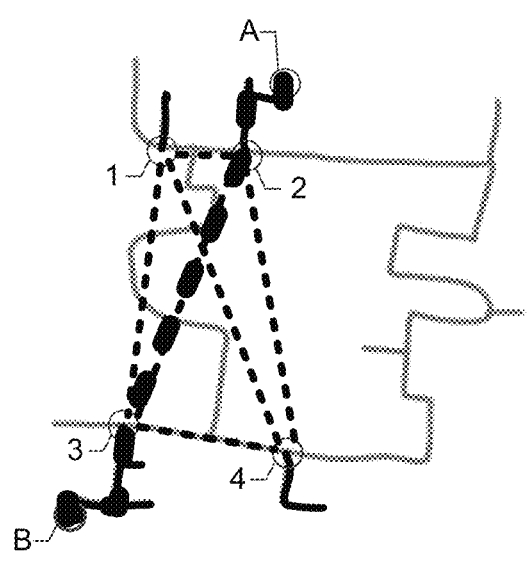 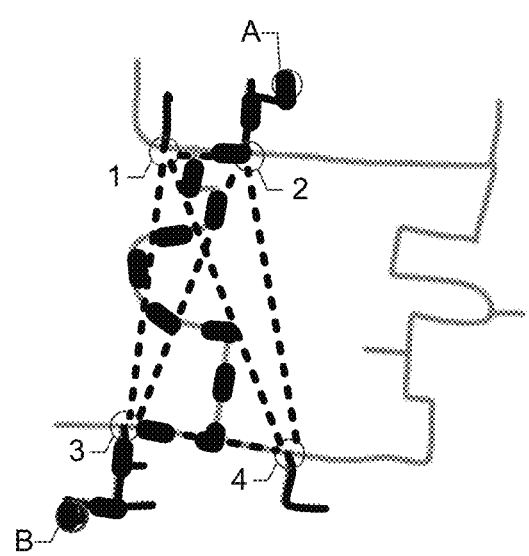
FIG. 6.5　　　　　　　　　　FIG. 6.6

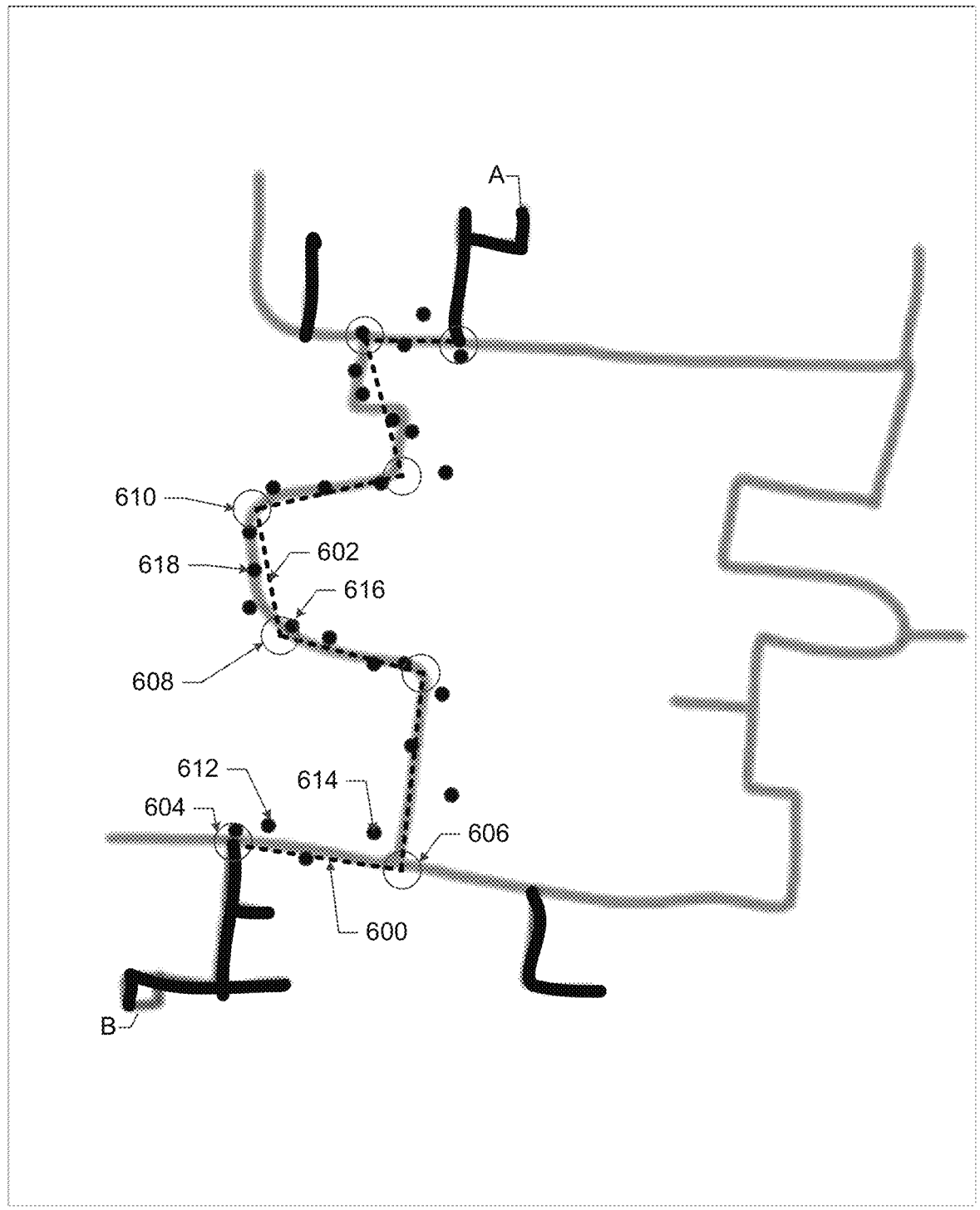
FIG. 6.7

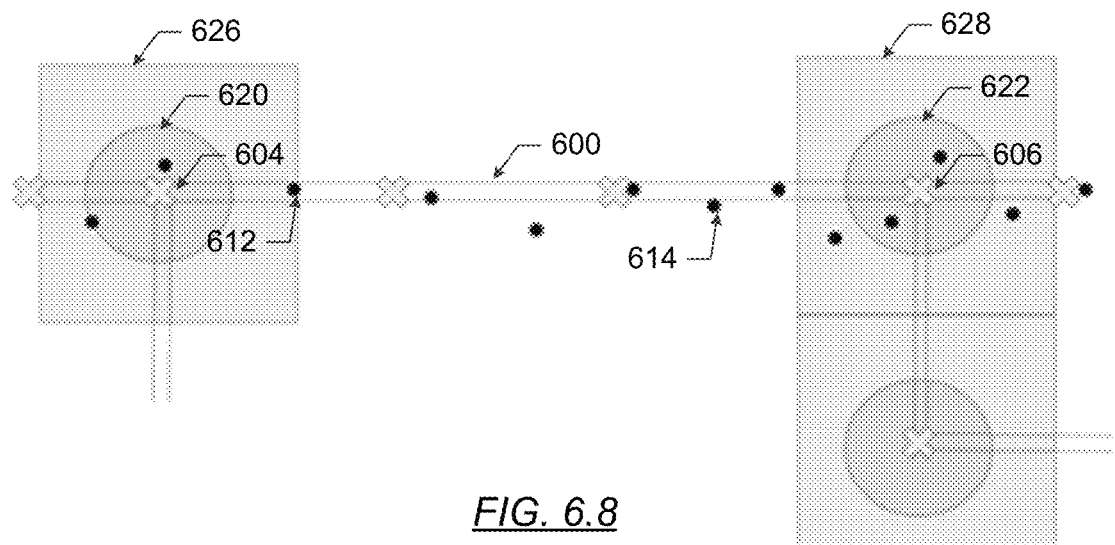
FIG. 6.8
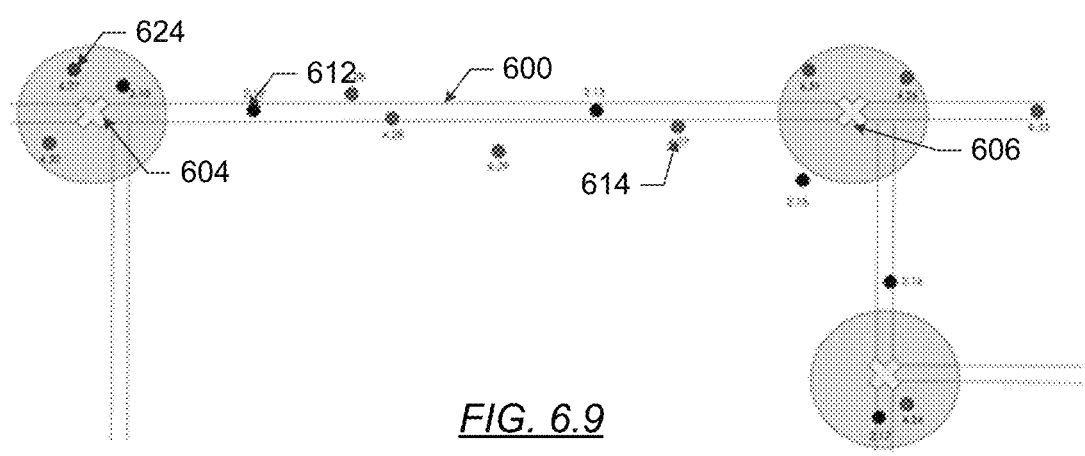
FIG. 6.9

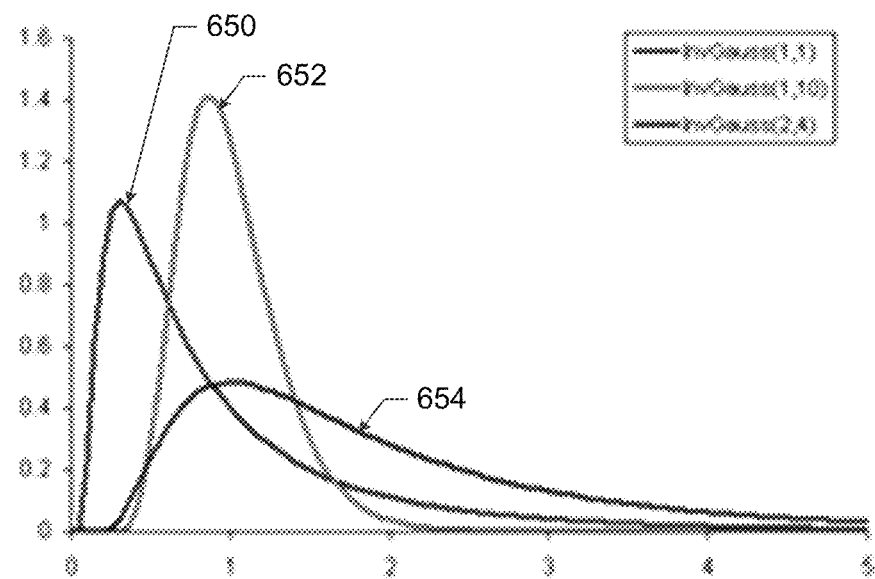
FIG. 6.10
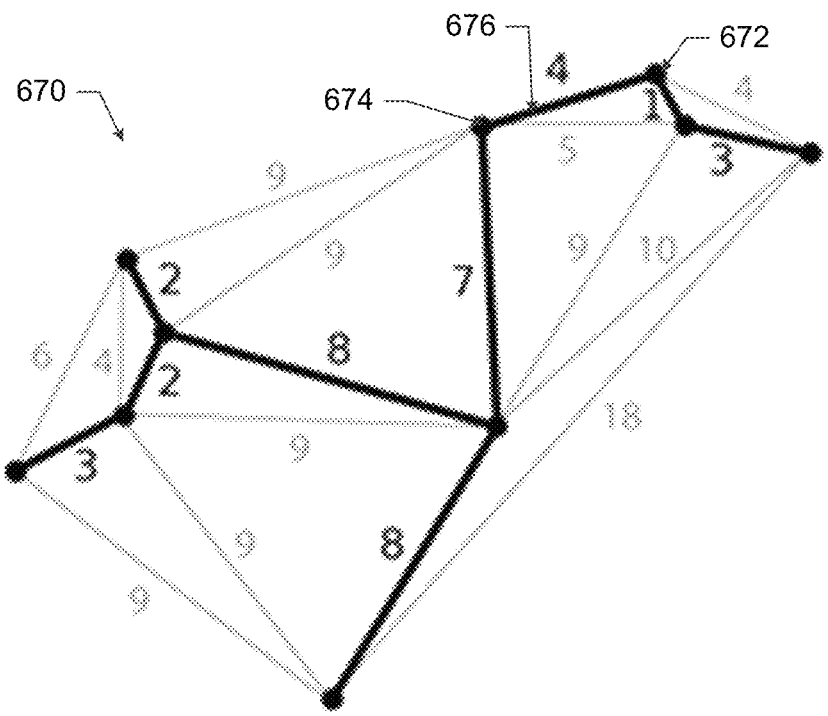
FIG. 6.11

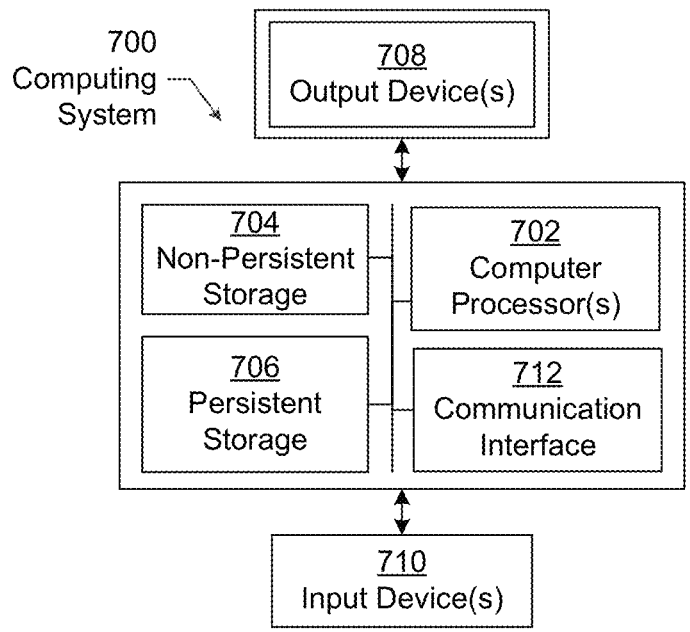
FIG. 7.1
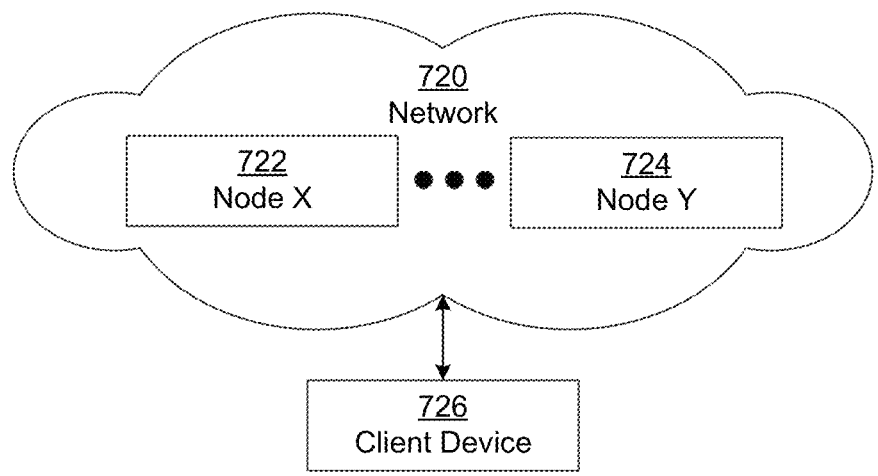
FIG. 7.2

SYSTEM FOR OFFSITE NAVIGATION

CROSS REFERENCE TO RELATED APPLICATIONS

This application is a Continuation-in-Part Application of and claims priority to U.S. patent application Ser. No. 16/878,524, filed on May 19, 2020; which claims priority to U.S. Provisional Patent Application No. 62/850,482 filed on May 20, 2019, entitled, "System for Offsite Navigation."

BACKGROUND

Various computer services offer digital maps and driving instructions on known public roads. In order to provide maps and driving instructions, the services rely on a single repository of geocoded road information. When a request is received for a route, the single repository of geocoded road information is searched to identify the path.

A problem exists in providing maps and navigation for routes that span public and private roads, such as rural company roads, roads of oil leases and other such unmapped roads. For example, oilfield companies may have challenges in obtaining navigation for routing that includes oilfield roads. Many private roads are constructed quickly and may be dirt or gravel roads which have changing conditions. As such, computer services that are focused on public roads do not provide routing for private routes.

SUMMARY

The one or more embodiments provide for a method. The method includes generating, by a navigation service, a route for navigating from a route origin to a route destination using a private roads repository. The method also includes identifying a ghost origin and a ghost destination of a ghost road along the route. The method also includes sending, using an application programming interface of a base roads engine, a first request for a route from the ghost origin to the ghost destination. The method also includes receiving, from the base roads engine in response to the first request, a replacement section from the ghost origin to the ghost destination. The method also includes replacing, in the route, the ghost road with the replacement section to create an updated route including segments. The method also includes generating an estimated travel time from the route origin to the route destination over the segments of the updated route. The method also includes presenting the estimated travel time.

The one or more embodiments also provide for a system. The system includes a private roads repository storing private roads and a ghost road. The system also includes a navigation service, executing on a computer processor, operatively connected to the private roads repository and configured to perform operations. The operations include generating, by a navigation service, a route for navigating from a route origin to a route destination using the private roads repository. The operations also include identifying a ghost origin and a ghost destination of a ghost road along the route. The operations also include sending, using an application programming interface of a base roads engine, a first request for a route from the ghost origin to the ghost destination. The operations also include receiving, from the base roads engine in response to the first request, a replacement section from the ghost origin to the ghost destination. The operations also include replacing, in the route, the ghost road with the replacement section to create an updated route including segments. The operations also include generating an estimated travel time from the route origin to the route destination over the segments of the updated route. The operations also include presenting the estimated travel time.

Other aspects will be described below and with reference to the accompanying figures.

BRIEF DESCRIPTION OF DRAWINGS

FIG. 1.1 shows a diagram of a system in accordance with one or more embodiments.

FIG. 1.2 shows a software diagram of a system in accordance with one or more embodiments.

FIG. 5.1 shows a flowchart for adding ghost roads in accordance with one or more embodiments.

FIG. 5.2 shows a flowchart for presenting an estimated travel time in accordance with one or more embodiments.

FIG. 5.3 shows a flowchart for presenting an estimated time of arrival and an estimated risk of delay in accordance with one or more embodiments.

FIGS. 6.1, 6.2, 6.3, 6.4, 6.5, 6.6, 6.7, 6.8, 6.9, 6.10, and 6.11 show an example in accordance with one or more embodiments.

FIGS. 7.1 and 7.2 show a computing system in accordance with one or more embodiments of the technology.

DETAILED DESCRIPTION

Figure 2:
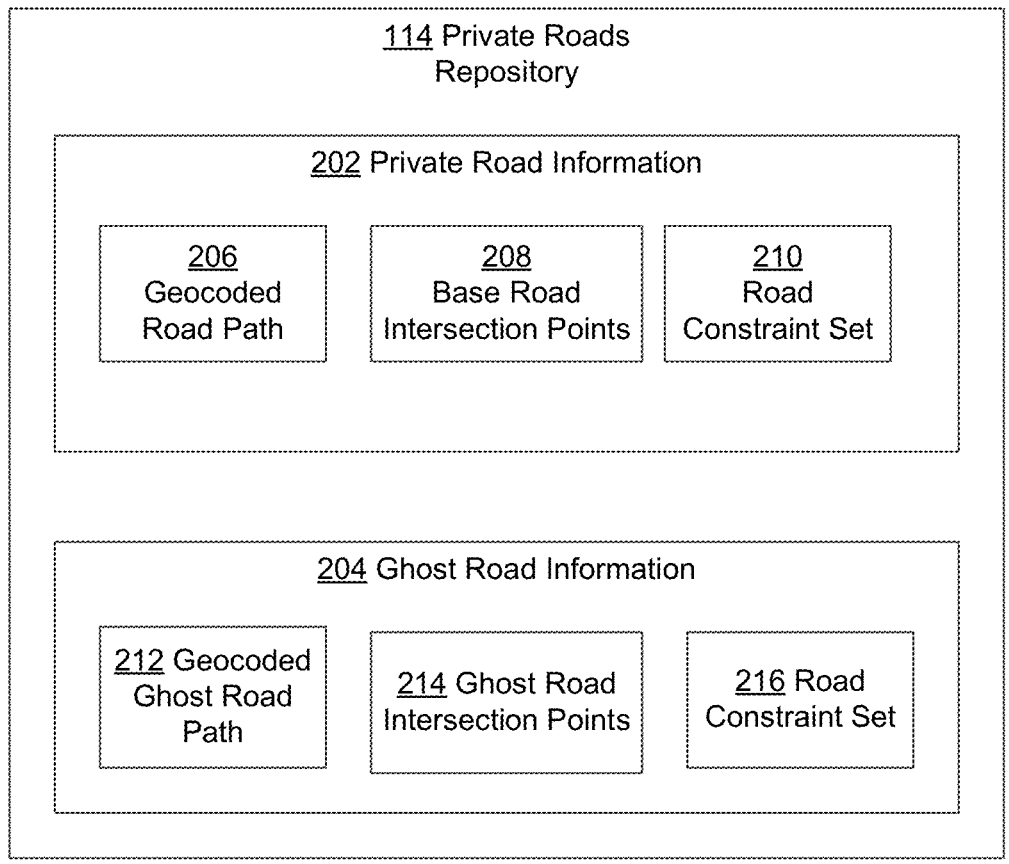
FIG. 2 shows a diagram of a private roads repository in accordance with one or more embodiments.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to route planning that includes both base and private roads. A base road may be a public road, semi-public road, a third-party private road, such as roads that have another entity maintain and expose a separate routing service, such as a third-party company. An example of base roads may be the roads of a public utility, a public road, or the roads of a different company.

Specifically, a private roads repository includes information about private roads and ghost roads. A ghost road is a proxy of a base road route formed from one or more base roads. One or more embodiments use the private roads repository to identify a route between two endpoints. The route includes one or more ghost roads. A ghost road is a road that does not exist and is a placeholder for another road or set of roads. Using an API call to a base roads service, the one or more ghost roads may be replaced in the route with the actual base roads. The resulting route may be presented.

In one or more embodiments, pluggable containers having databases and software are used to provide routing. Pluggable containers may independently operate to provide routing between a pair of locations. By using pluggable containers, different containers may be added to the system to expand functionality of the system and to customize the functionality. For example, if a user prefers a particular routing service for a geographic region, the particular routing service may be added via the container architecture. Further, if a geographic region is not covered by existing containers, different new containers may be added.

In one or more embodiments, at least one of the containers is a private roads container. Private roads are roads that are absent in the base roads. For example, private roads may be private because the roads are not widely publicly known outside of a geographic region. By way of an example, country dirt roads may be absent from public mapping services, such as GOOGLE MAPS™ mapping service, and therefore considered a private road with respect to such mapping services. As another example, private roads may be located on private lands. As such, private roads may be referred to as supplemental roads, because the listing the supplemental roads supplements the listing of the base roads on at least one mapping service.

The private roads container includes information and a routing service for private roads. One or more embodiments further provide various techniques for identifying roads and adding such roads to a private roads repository, such as through the use of tracking data, analysis of satellite images, and manual additions. One of the techniques is to use tracking data. For example, through cluster and linearization analysis on the tracking data, roads may be identified and added. Another technique is based on analysis of satellite and other images.

In one or more embodiments, additional techniques are provided for determining estimated times of arrival (ETAs) over a route that includes both base roads and private roads. In particular, ETAs may be calculated from data taken from historical trips by vehicles over the base roads and private roads. Historical data is matched to an existing road network in a process termed map matching.

A road network is segmented into segments of roads, with each segment being between any given two subsequent intersections points. Time stamps are collected from historical trips on each segment. The ETA for a planned future trip is calculated by creating the distribution of times across each pair of intersections through which the vehicle will pass.

In the one or more embodiments, a graph database may be used for storage and retrieval of the time across each segment. The final calculation of an ETA from point A to point B is performed as a combination of time distributions between the road segments on the route from A to B.

Turning now to FIG. 1.1, FIG. 1.1 shows a diagram of a system in accordance with one or more embodiments. As shown in FIG. 1.1, the system includes tracking devices (100), a base roads service (102), a maps computing system (104), and a network (106). Each of these components are described below.

Tracking devices (100) include software and/or hardware that include functionality to track vehicles on base and/or private roads. For example, the tracking devices may be geo-positioning system (GPS) devices located on the vehicles, user mobile devices, and other sources. The tracking devices may include functionality to track the location and speed of a vehicle. In one or more embodiments, tracking devices further includes functionality to store weights of vehicle.

A base roads service (102) is a service that is configured to provide navigation and routing for base roads. For example, the base roads service (102) may be a public roads service, such as GOOGLE MAPS™ mapping service, WAZE™ GPS-based geographical navigation application, APPLE® Maps, or other mapping application. The base roads service (102) includes a base roads repository (108), a base roads engine (110), and an API (112). The base roads engine is a data repository that stores information about base roads. The base roads engine (110) is software and/or hardware that is configured to provide mapping and navigation functionality for base roads. The base roads service (102) is accessible via the API (112). The API (112) is the interface by which other applications may request routing on base roads.

A maps computing system (104) is connected via a network (106) to the tracking devices (100) and the base roads service (102). The network (106) may be a mobile network, the Internet, or another network, such as described in reference to FIGS. 7.1 and 7.2. The maps computing system (104) includes a private roads repository (114), a navigation service (116), a constraint identification service (118), a road identification service (120), a user interface (122), and an API (124). Each of the components of the maps computing system (104) is described below.

The private roads repository (114) is any type of storage unit and/or device (e.g., a file system, database, collection of tables, or any other storage mechanism) for storing data. Further, the private roads repository (114) include multiple different storage units and/or devices. The multiple different storage units and/or devices may or may not be of the same type or located at the same physical site. The private roads repository (114) is described in further detail in FIG. 2.

Turning to FIG. 2, FIG. 2 shows a schematic diagram of the private roads repository (114) in accordance with one or more embodiments. As shown in FIG. 2, the private roads repository (114) includes private road information (202) for each stored private road and ghost road information (204) for each ghost road. An individual private road information may exist for each stored private road and individual ghost road information (204) may exist for each ghost road. A private road is an actual road that is located on typically unmapped geographic regions. For example, a private road may be located on private land, corporation land, a utility corridor, a road on an easement, or other such road. A private road, for example, may be a quickly constructed road, such as a dirt or gravel road. As another example, the private road may be a temporary road having a limited time span. The private road may have size, speed, and weight constraints.

A ghost road is a proxy road that represents connections between intersection points of private roads with base roads. In other words, the ghost road is a proxy for one or more base roads. The ghost road acts as a placeholder for the base roads. In one or more embodiments, any path of the ghost road includes at least a disjoint section from the ghost road.

Thus, at least one road of the private road is different from a ghost road. Multiple routes between two intersection points that include one or more base roads may be represented by the same ghost road. For example, the ghost road may be a straight line between base roads.

Continuing with FIG. 2, private road information (202) includes a geocoded road path (206), base road intersection points (208), and a road constraint set (210). A geocoded road path (206) is a definition of a path of a private road using a coordinate system (e.g., longitude and latitude). The geocoded road path (206) identifies the route of the road geographically. The private road information (202) further includes base road intersection points (208). Base road intersection points are geolocations at which the private roads intersect base roads. A base road intersection point may be located at an endpoint of the base road, or in between endpoints of the base road (e.g., in the middle of the base road). The base road intersection point may be defined using a coordinate system. The road constraint set (210) is a set of constraints for a vehicle to use the private road. For example, the road constraint set (210) may be a maximum weight, a maximum or minimum size, speed, road angle constraints, or other constraint on vehicles using the road.

Similar to private road information, ghost road information (204) includes a geocoded road path (212), ghost road intersection points (214), and a road constraint set (216). The geocoded road path (206) is a definition of a path of the ghost road and may be in a coordinate system (e.g., longitude and latitude). Because the ghost road does not exist, the geocoding ghost road path does not follow an existing road or set of roads. For example, the geocoded ghost road path may be a straight-line path between base road intersection points of two private roads. The geocoding may be the same or similar to the private road geocoding. The intersection points are the locations at which the ghost road intersects a private road. The ghost road intersection points (214) may include the same set of points as the base road intersection points for one or more base roads. In one or more embodiments, the intersection points are endpoints of the ghost road. The intersection points may be defined in a same or similar manner as the base road intersection point. The road constraint set (216) is a set of constraints for a vehicle to use the underlying base roads of the ghost road. For example, the speed constraint may be a function of the speeds of the routes of base roads. One function is to determine an average speed along each route and use the maximum of the averages as the maximum speed. Another function is an average speed. As another example, a preferred route may be predetermined, and the average speed of the preferred route may be used. The weight constraint may similarly be a function of the weight constraints of each route. The weight constraint may be the maximum weight across the various underlying base road routes, whereby the weight for each route is the lowest maximum weight for the roads on the route. The distance may be the minimum distance of the routes. Other functions may be used for the constraints without departing from the scope of the invention. As with the private roads, the road constraint set (216) may be a maximum weight, a maximum or minimum size, speed, road angle constraints, any hazardous material constraints, or other constraint on vehicles using the road.

Multiple ghost roads may exist with the same intersection points. Each ghost road may have a separate set of constraints. Thus, for example, if one road allows for construction vehicles and another is for highway vehicles, both may be represented in the ghost road information.

Although FIG. 2 shows separate storage between ghost road information and private road information, the same storage structure may be used for both. Whether a particular road is a ghost road or private road may be defined, for example, using a flag stored in the road information.

Returning to the maps computing system of FIG. 1.1, a navigation service (116) is connected to the private roads repository (114). The navigation service (116) includes functionality to receive parameters of a route request and return a route matching the parameters. The parameters may include, for example, size of the vehicle, weight, a route origin, a route destination, and other information. The route origin is the starting location of the requested route. The route destination is the ending location of the requested route. The navigation service may perform the functionality of FIG. 3, described below.

The navigation service (116) is also connected to a metadata repository (117). The metadata repository (117) is one or more storage units and/or devices (e.g., a file system, database, collection of tables, or any other storage mechanism) for storing data. Multiple different storage units and/or devices may or may not be of the same type or located at the same physical site. The metadata repository (117) stores information describing past trips performed by vehicles over private roads in the private roads repository (114) and/or public roads in the base roads repository (108). Examples of information stored in the metadata repository (117) include, but are not limited to timestamps, locations, waypoints, vehicle information, etc. The use of the metadata repository (117) is described further with respect to FIG. 5.2.

The metadata repository (117) is connected to a vector generator (119). The vector generator (119) is a software application configured to convert at least some of the data stored into the metadata repository (117) into a vector. A vector is a data structure configured for input to a machine learning model. A vector may take the form of a one-dimensional array of data, where each entry in the data structure reflects a value for a feature.

A feature is a type of data of interest. For example, a feature may be a particular metadata item associated with a GPS recording (e.g. a timestamp). In this case, the entry in the vector is the value of the feature (i.e., the value of the timestamp associated with that GPS recording). An entry may also reflect a range of data, or a transform, of information in the metadata repository (117). For example, if the data of interest satisfies a criterion (e.g., being within a range, or satisfies a function), then the entry for the feature has a first value and, if not, the entry for the feature has a second value. Thus, the vector generator (119) may transform, rather than simply copy, the data in the vector generator (119). However, certain entries of the vector may be copied directly from the data stored in the metadata repository (117).

The navigation service (116) is also connected to a machine learning model (121). A machine learning model is a software application that is programmed to identify patterns in input data and then output a prediction, a classification, or some other output related to the input data. The input to the machine learning model (121) is the vector produced by the vector generator (119). The output of the machine learning model (121) may vary, but for example may be a prediction related to how a new road in the private roads repository (114) should be clustered with known roads in the private roads repository (114).

The machine learning model (121) may be of different types. In an example, the machine learning model (121) is an unsupervised clustering machine learning algorithm. However, the machine learning model (121) could also be a neural network, a supervised machine learning model, an unsupervised clustering machine learning model, or some other machine learning model.

The constraint identification service (118) includes functionality to obtain tracking data and validate the existence of one or more private roads. The constraint identification service (118) may further include functionality to determine a constraint set for one or more roads on the route based on the tracking information. Tracking information is information gathered by tracking particular vehicles. For example, tracking information may be a set of geocoded points. One or more of the geocoded points in the tracking information may be related in the tracking information with a timestamp identifying when the vehicle was located at the geocoded point. Tracking information may also include information about the particular vehicle, such a weight of load, type, class, and other information about the vehicle. Using the tracking information, the constraint identification service (118) is configured to generate statistics about vehicles traveling on the respective roads. From the statistics, the constraint identification service may extrapolate the respective road constraints of the private roads.

The road identification service (120) includes functionality to identify private roads based on images and tracking information. Specifically, the road identification service (120) is configured to identify new roads and validate existing roads. The road identification service (120) is further configured to generate ghost roads. The operations performed by the road identification service is described below in relation to FIGS. 4 and 5.

In one or more embodiments, the road identification service (120) includes an image recognition engine (126) and a tracking engine (128). The image recognition engine (126) is a tool that is configured to determine the location of roads from images, such as satellite images. In one or more embodiments, the image recognition engine (126) may be implemented as a neural network, such as a convolution neural network. In one or more embodiments, the image recognition engine (126) may be implemented as a set of rules that is based on color values of pixels in an image and/or color gradient. The tracking engine (128) includes functionality to determine the location of roads based on tracking information from vehicles traveling the roads. The tracking engine (128) may be implemented as a set of rules, clustering analysis algorithms, and/or linearization algorithms.

A user interface (122) and API (124) are communicatively connected (not shown) to the various components of the maps computing system (104). The user interface (122) and the API (124) are interfaces by which the functionality of the maps computing system may be obtained. In one or more embodiments, the user interface may be a graphical user interface, an audio interface, other interface, or have a combination thereof. For example, a driver or scheduler may request navigation from the navigation service using the user interface (122). As another example, the driver may mark private roads and, optionally, base roads, in a map, using the user interface (122). Thus, the user interface (122) is configured to receive a request for navigation and present results of the navigation request. Similarly, the user interface (122) is configured to display a map of a region and receive information describing private roads in a region. The API (124) include similar functionality as the user interface (122) and exposes the functionality of the maps computing system (104) to other software components.

FIG. 1.2 shows a software architecture diagram (150) in accordance with one or more embodiments of the disclosure. The software architecture shown in FIG. 1.2 further describes FIG. 1.1 with respect to the container architecture and communication paths. The key (152) identifies the data flow and internal services requests/responses. As shown in FIG. 1.2, a frontend service (154) is connected to a routing service (156). The frontend service (154) includes the user interface (122) and the API (124) in FIG. 1.1 through which routing may be requested. The routing service (156) may be the navigation service (116) in FIG. 1.1.

Continuing with FIG. 1.2, the private roads container with private roads database and routing service (158) may be the private roads repository, road identification service, and constraint identification service in FIG. 1.1. The remaining containers in FIG. 1.2 may each include the same or similar components as the base roads service (102) in FIG. 1.1. For example, the remaining containers may at least include a roads repository, a roads engine and an API to request services of the container. The containers may include the base road container with the roads database and routing service (160).

Additional containers may also exist. For example, a multinational company may have an additional individual private roads service container (162) for each nation or geographic in which the multinational company operates. Similarly, additional base roads service container (164) may exist for different mapping services and/or for different geographic regions. Although two additional containers are shown, the system may include any number of additional containers.

As an additional example, the containers may also include an estimated time of arrival container (165). The estimated time of arrival container (165) may include a graph database (167), the metadata repository (117) shown in FIG. 1.1, and/or the machine learning model (121) shown in FIG. 1.1. The navigation service (116) of FIG. 1.1 may access the estimated time of arrival container (165) in order to generate an estimated time of arrival for a planned future vehicle trip. Generation of the estimated time of arrival is described further with respect to FIG. 5.2.

The graph database (167) is a type of data structure used to store data related to calculating an estimated time of arrival. Thus, for example, the graph database (167) may be an example of the metadata repository (117) in FIG. 1.1.

The graph database (167) is a type of database that uses graph structures for semantic queries. Nodes, edges, and properties are used to represent and store data. The graph relates the data items in the store to a collection of nodes and edges, with the edges representing the relationships between the nodes. The relationships allow data in the store to be linked together directly for later retrieval.

For example, the nodes in the graph database (167) may represent intersections of roads in the private roads repository (114). The nodes are connected by edges, as shown in FIG. 6.11. The edges represent segments between the intersections. The edges store additional data that define the relationships between the nodes. For example, the additional information may be weights that contain relevant information on the distributions of time estimates, such as the location and scale of the distributions.

In order to account for the differences in bidirectional traffic flow on each segment the graph database (167) may be a bidirectional graph network. A bidirectional graph network is a graph database (167), but the edges are directional. In other words, two segments connect each node.

Information relating to the direction of travel between the two nodes may be stored in the respective segments connecting the two nodes.

As mentioned above, an example of the graph database (167) is shown in FIG. 6.11. An example of a use for the graph database (167) is described with respect to FIG. 5.2.

In the container architecture, different mapping services are accessible in separate containers. Each container maintains a distinct set of roads and routing service. The roads may be stored in heterogeneous formats between containers. Further, the containers may have different algorithms from other containers to create a route. When new containers are added, the routing service (156) is configured to use the API of the various containers to request a portion of the route. For example, a routing service may include a routing service API exposes the portion of the route regardless of the containers having the portion of the route. The routing services API may transmit a request to a container using the container's API. Thus, each container receives the request using the interface expected by the container.

The Persistent Volume Claim (PVC) abstraction layer (166) is configured to add data for a container. To provide a location to store data and prevent data from being lost, persistent volumes may be created to store data outside of containers. The PVC is a mechanism to store the data.

While FIGS. 1.1, 1.2, and 2 shows a configuration of components, other configurations may be used without departing from the scope of the technology. For example, various components may be combined to create a single component. As another example, the functionality performed by a single component may be performed by two or more components.

Figure 3:
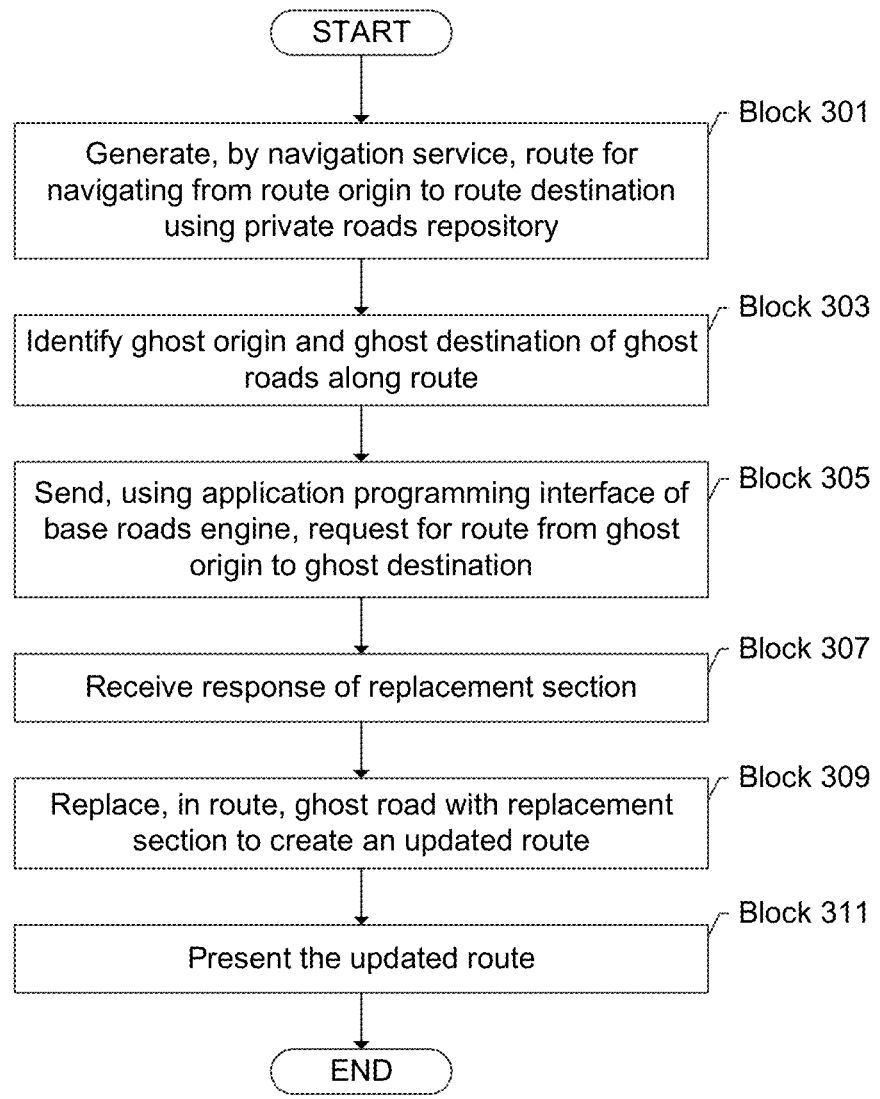
FIG. 3 shows a flowchart for generating a route in accordance with one or more embodiments.
Figure 4:
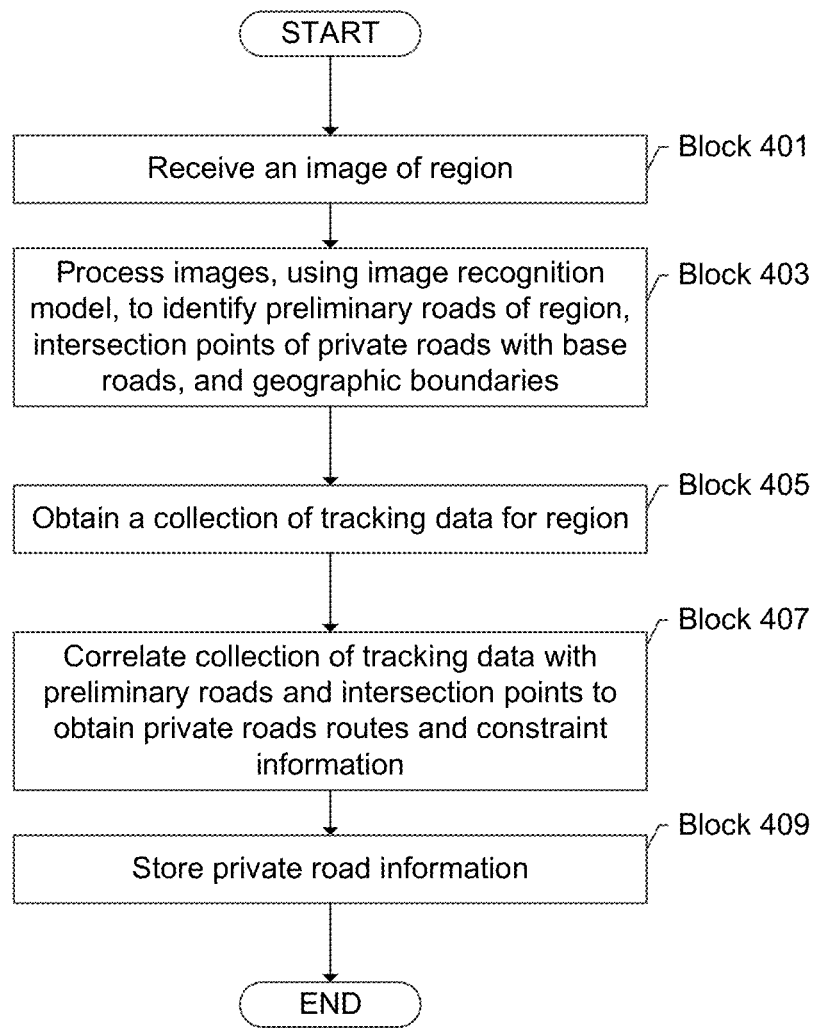
FIG. 4 shows a flowchart for adding private roads in accordance with one or more embodiments.

FIGS. 3-5 show flowcharts in accordance with one or more embodiments. While the various steps in this flowchart are presented and described sequentially, one of ordinary skill will appreciate that at least some blocks may be executed in different orders, may be combined or omitted, and at least some blocks may be executed in parallel. Furthermore, the blocks may be performed actively or passively. For example, some blocks may be performed using polling or be interrupt driven in accordance with one or more embodiments of the technology.

In Block 301, the navigation service generates a route for navigating from a route origin to a route destination using a private roads repository. Using the user interface or the API of the maps computing system, the navigation service receives a routing request that includes various parameters. The parameters in the route origin and the route destination. The route origin and/or route destination are locations that are on a base road or on a private road. If the route origin or route destination is a location on a base road, the location may be defined in the private roads repository (e.g., as a private road having a short length, such as a zero length, one foot length, length of a driveway or parking lot, etc.). For example, a limited number of locations may exist, such as company headquarters, house, locations of customers, or other locations may be stored as a private road. The parameters may include additional information about the vehicle being used, such as weight or weight class, size or size type, or other information. If the route request includes an intermediate stop location along the route, the routing request may be partitioned into two requests, whereby the route origin to the intermediate stop location as the route destination is a first request and the intermediate stop location as the route origin to the route destination is a second request.

Navigation from the route origin to the route destination may be performed using any algorithm known in the art or later defined. For example, a series of independent services may be used in order to fulfill a navigation request. First, names or addresses of the route origin and route destination are translated into geolocations using a geocoding service. The geolocations are then passed on to a directions service which provides a route and driving instructions. Finally, the route is displayed on top of graphical map loaded from a tiles service.

While performing the navigation of Block 301, the private roads repository is solely used for routing. Ghost roads are treated as actual roads when performing the routing. Thus, navigation proceeds across private and ghost roads without consideration of whether the road is a ghost road or an actual private road. By using ghost roads, one or more embodiments do not need to track traffic information on base roads, track road construction on base roads, or maintain information about base roads. Because base roads include public roads and because the base road network is generally several orders of magnitude larger than the private roads of a company, the use of ghost roads means that the maps computing system may disregard the route on the base roads.

In Block 303, a ghost origin and a ghost destination of ghost roads along the route are identified. After the route is determined, the ghost roads along the route are identified. For example, the navigation service may iterate through the roads along the route to determine whether the road information for the corresponding road denotes the road as a ghost road. For any road denoted as a ghost road, the ghost origin of the ghost road and the ghost destination of the ghost road is identified. The ghost origin and the ghost destination are locations at which a private road intersects a base road. Thus, the ghost origin and ghost destination correspond to locations on a base road as well as on a private road. In one or more embodiments, when ghost roads are incorporated into the route, the travel time and distance for the ghost road are used. As described above, the travel time and distance are generated for a ghost road based on statistics gathered from the base roads that may be used for the ghost roads. Because the underlying base roads or conditions thereof may change without notification, the statistics is an estimation of the distance and travel time.

In Block 305, using the API of the base roads engine, a request for a route is sent from the ghost origin to the ghost destination. The navigation service issues the request to specify the ghost origin as the origin of the requested route and the ghost destination as the destination of the requested route. In other words, the base roads service is not notified that the requested route is an intermediary route. Moreover, the base road service does not need to use the information about the requested route being an intermediary route. The base road engine uses the base road repository to determine a route from the requested origin to the requested destination. The request to the base road service may further include one or more of the parameters, such as weight class, and other parameters that was received in the request in Block 303.

In Block 307, a response is received from the base roads engine where the response includes a replacement section. To the base roads service, the response is a complete route from the origin (i.e., ghost origin) to the destination (i.e., ghost destination) and is returned via the API of the base roads service. To the navigation service, the response is the section.

In Block 309, in the route, the ghost road is replaced with the replacement section to create an updated route. In other words, the navigation service plugs the route received in Block 307 into the portion of the route generated in Block 303 that corresponds to a ghost road. The process of Blocks 305, 307, and 309 may be performed for each ghost road along the route. The result of performing Blocks 303-309 is a route that spans both base and private roads.

In one or more embodiments, multiple alternative routes spanning base and private roads may be created using the Blocks 303-309. The number of routes may be limited in order to comply with computing resource constraints. The various alternative routes may be compared after Block 309 to select a route having minimal travel time or other objective.

In Block 311, the updated route is presented in accordance with one or more embodiments. For example, the updated route may be transmitted to a requesting computing system, graphical user interface, displayed, played, or otherwise presented to the user or application requesting the route.

By way of an example, a route may be from an origin of a company to a wellsite on a private road. The parking lot of the company may be maintained in the private roads database as a private road. The route may include the parking lot of the company through public roads, to private roads, then along roads of a third-party company, followed by roads of the private company. The portion of the route along the public roads and the portion of the route along the third-party roads may each be represented as a ghost road in the private roads repository. By querying the respective containers, the ghost roads may be replaced with the corresponding actual base roads. Thus, a complete route is created and returned to the user.

As described above, one or more embodiments provide a technique for combining private roads with base roads. Various techniques may be performed to identify private roads in accordance with one or more embodiments. In Block 401, an image of a region is received. In one or more embodiments, satellite images of one or more regions is obtained. The satellite images may include metadata identifying the region and the scale of the images.

In Block 403, the images are processed using an image recognition model, to identify preliminary roads of a region, intersection points of private roads with base roads, and geographic boundaries. The processing of images may be performed based on the color value and gradients in the images. Specifically, each image is composed of pixels, where each pixel has a color. Neighboring pixels, whose color is within a threshold degree of variability of each other, may be marked as contiguous section (i.e., section in the discussion below). Depending on the scale and resolution of the image, if two or more contiguous sections are divided by a threshold number of pixels, then the two or more contiguous sections may be combined because the pixels in between the two contiguous sections may be deemed to be erroneous. Color gradients may be used to denote geographic boundaries in the image. Specifically, a boundary between sections may be identified based on neighboring contiguous sections having a large color gradient between the sections (e.g., one section being substantially green and the other section being substantially tan).

External information, such as the composition of private roads (e.g., gravel, dirt, tar, concrete etc.) may be further used to identify private roads. For example, if the roads are gravel or concrete, then white or light pixels may be identified as possible roads. As another example, if the roads are dirt, then tan pixels may be identified as possible roads. Further, sections that are substantially green or private may be marked as not corresponding to a road. Likewise, if the private roads are dirt roads, then black may be identified as a geographic boundary, such as a fence, utility line, equipment, pipeline, or other non-road. For geographic boundaries, the image may be processed to identify crossing points in which a preliminary road crosses the geographic boundary.

The shape of the sections in the image may be used to identify various roads. For example, sections having at least a threshold length and between a minimum and maximum width may be identified as road. Because roads may terminate in a parking lot or intersect a parking lot, if a section intercepts a larger section, the larger section may be identified as a parking lot.

In some embodiments, a base map of the region is requested from the base roads service. The base map of the region is overlaid onto the image of the region to identify intersection points between base and private roads. Specifically, where a base road intersects from the base map has a same geographic location, or within a threshold distance, as a location along a preliminary private road, an intersection point for the preliminary private road may be identified. The intersection point may be in the middle of the base road or at an endpoint of the base road.

In some embodiments, from the image processing, based on the color and width of a preliminary private road, a preliminary constraint set may be determined for the private road. For example, the larger width may denote larger weight limits and size of vehicles, whereas a smaller width may denote a small weight limit. Similarly, color may be indicative of composition of the road, which has a maximum weight.

In Block 405, a collection of tracking data for a region is obtained. As vehicles travel along various roads in a region, the tracking devices on the vehicles record tracking information. The tracking information may include the path of the vehicle, speed, and information about the vehicle, such as the make and model, weight, load, and other information. The information is transmitted, such as via the network, to the maps computing system periodically, in real-time, upon request, etc.

In Block 407, the collection of tracking data is correlated with preliminary roads and intersection points to obtain private roads routes and constraint information. For example, if the paths of one or more vehicles, or a threshold number thereof, substantially is along a preliminary road, the preliminary road may be marked as a validated private road and stored in the private roads repository. In contrast, if the path of no vehicle is along a private road for a certain duration of time, the private road may be marked as destroyed, non-existent, or not validated.

If a threshold number of vehicles travel along a path that does not correspond to a preliminary road or a base road, a new private road may be identified. Because paths of vehicles are not strictly linear, processing paths of vehicles to identify roads may include grouping paths that are substantially adjacent and collinear.

Similarly, where the tracking information shows a vehicle transitioning from a preliminary private road to a base road on the base roads map, an intersection point is identified. As such, intersection points may be identified and/or validated.

Statistics about the vehicle and speed may be gathered and used to identify the constraint set for the vehicle and the private roads. Further, information about the length of time that a vehicle is stationary may be used to identify possible origins and/or destinations to mark along a private road.

Although not shown, users may validate and/or provide information about private roads in the private roads repository using the user interface.

Rather than or in addition to correlating tracking data with preliminary roads and intersection points, tracking data may be used directly to identify private roads as follows. The tracking data may include beacon information of a vehicle. The beacon information may identify a set of geolocations with corresponding timestamps. For example, a beacon may be recorded each 15 seconds with a timestamp identifying when vehicle was at the location.

A cluster analysis may be performed on the set of beacons in each segment of a geographic region to create a set of cluster centers. Logical transformations are performed to link cluster centers together. The linkage is performed based on adjacency of timestamps of beacons, the adjacency between beacons of different clusters. Distances between centroids of a cluster may be based on new roads and/or flawed location information (e.g., inaccuracies between readings). While computing clusters, the maximum distance of beacons from each cluster centroid is determined. The maximum distance may be used to detect whether if new traces from the system result in new roads that need to be drawn on the map. For example, new roads may be indicated when multiple beacons are away from a cluster centroid. To figure out the new road, the bacons are not within a threshold distance to cluster centroids are filtered out and separately clusters. A new road is created along a path along the cluster centroid. Smoothing may be performed to make the road more linear. With an increase in the number of clusters, more and more fine-grained information about the road and more linear representation of a road is created.

Using the operations of FIG. 4, new roads may be quickly added to the private roads data repository. For example, dirt and gravel roads are often built quickly. When private roads include dirt roads, the private roads network may change week by week. One or more embodiments create a seamless way to add to the private road data repository quickly and when the private roads are first used.

In Block 409, the private roads information is stored. In particular, the private roads information is stored in the private roads repository. For example, the various preliminary and validated roads may be geocoded and stored.

FIG. 5.1 shows a flowchart for adding ghost roads to the private roads repository. In Block 501, private roads are identified. In Block 503, intersection points of private roads with base roads are identified. Identifying private roads and intersection points may be performed as described above with reference to FIG. 4. In particular, where the coordinates of the private road are at least within a threshold distance of the coordinates of a base road, an intersection point may be identified. In some embodiments, if the coordinates are separated by an identified geographic boundary, then no intersection point is identified.

In Block 505, using the API of the base roads engine, a request for travel times and distances is sent to the base roads engine. In one or more embodiments, pairs of intersection points are generated, each pair corresponds to a ghost origin and a ghost destination for a ghost road. In some embodiments, the identified pairs are a cartesian product of the set of intersection points with itself. In some embodiments, the generated pairs may be filtered to remove unlikely combinations, such as being within a threshold distance along a single private road, being partitioned by a section spanned by private roads, etc. In some embodiments, pairs are generated based on being likely combinations.

For each generated pair of intersection points, a request is sent to the base roads service. The request may be sent in a same or similar manner as the request in Block 305. In particular, the first intersection point in the pair may be the requested route origin and the second intersection point may be the requested route destination. The API of the base roads service may return distances and travel times, with or without the actual route, for one or more routes from the first intersection point to the second intersection point. Statistics from the resulting distances and travel times of various one or more returned routes, along with any other constraints are combined to determine a distance and travel time for the ghost road along with other constraints for the ghost road.

In Block 507, ghost roads between intersection points with travel times and distances. For each pair of intersection points a single ghost road is generated. The path of the underlying route or routes is immaterial to the path of the ghost road. For example, the geocoded path of the ghost road may be a straight line between the intersection points. The distance and travel time are generated based on a statistic. Further, other constraints about routes may be combined to create a single constraint set for the ghost road.

In Block 509, the ghost road is stored. Storing the ghost road may be performed in a similar manner as storing the private road, as described above with reference to FIG. 4.

Attention is now turned to FIG. 5.2. FIG. 5.2 shows a flowchart for presenting an estimated travel time in accordance with one or more embodiments. The flowchart of FIG. 5.2 may be performed using the systems shown with respect to FIG. 1.1 through FIG. 2.

Block 500 includes generating, by a navigation service, a route for navigating from a route origin to a route destination using a private roads repository. Block 500 is similar to block 301 of FIG. 3.

Block 502 includes identifying a ghost origin and a ghost destination of a ghost road along the route. Block 502 is similar to block 303 of FIG. 3.

Block 504 includes sending, using an application programming interface of a base roads engine, a first request for a route from the ghost origin to the ghost destination. Block 504 is similar to block 305 of FIG. 3.

Block 506 includes receiving, from the base roads engine in response to the first request, a replacement section from the ghost origin to the ghost destination. Block 506 is similar to block 307 of FIG. 3.

Block 508 includes replacing, in the route, the ghost road with the replacement section to create an updated route including segments. Block 508 is similar to block 309 of FIG. 3. However, in block 510, the updated route includes two or more segments. The route is segmented by establishing an interconnected series of sub-routes between waypoints between the route origin and the route destination. Time stamps are collected from historical trips on each of the segments. An example of segmentation is shown in FIG. 6.7.

Block 510 includes generating an estimated travel time from the route origin to the route destination over the segments of the updated route. Generation of the estimated travel time may be performed by using historical trip data. For example, the timestamps of historical trips by vehicles may be used to determine an average travel time along an individual segment in the route. The timestamps may be retrieved from a graph database, where nodes represent the waypoints (intersections) between segments and the edges represent connections between the waypoints (intersections).

Generating the estimated travel time may be performed by querying a graph database storing a subset of the segments as edges and storing intersections between the segments as nodes. At least some of the edges connect at least some of the nodes. The estimated travel time is then determined by combining data in the edges.

In another example, generating the estimated travel time may be performed by combining historical data of past trips over the segments. The historical data is stored in the edges of the graph database.

Generating the estimated travel time may also be performed by querying a graph database storing a subset of the segments as edges and storing intersections between the segments as nodes. At least two of the edges connect to each node to represent a bidirectional traffic flow for each of the segments. A direction of travel along the segments is identified using the edges. The estimated travel time is determined by combining data in the edges in the direction of travel.

Combining the travel times may be performed by simple summation. However, combining the travel times may further include weighting the historical data based on a vehicle type of a vehicle using the navigation service. The weighting is performed using weights associated with vehicle types as stored in the edges. The weights may be scaled over time.

Generating the estimated travel time may also involve use of the ghost roads. For example, generating may include querying a graph database storing a subset of the segments as edges and storing intersections between the segments as nodes, wherein at least some of the edges connect at least some of the nodes. A first travel time is estimated between the ghost origin and a first node in the nodes. A final travel time is estimated between the ghost destination and last node in the nodes. An intermediate travel time is estimated along the subset of the segments using data in the edges. The estimated travel time is then determined by combining the first travel time, the final travel time, and the intermediate travel time.

Similar determinations are made for the other segments in the route. The times for the segments are summed, or combined in some other manner, in order to generate the estimated travel time from the route origin to the route destination over the segments.

Block 512 includes presenting the estimated travel time. The estimated travel time may be presented according to one or more of several techniques. For example, the estimated travel time may be displayed on a graphical user interface of a user, such as a driver, a trip planner, etc. The estimated travel time may be provided to another software application which takes the estimated travel time as input in order to calculate some other output. The estimated travel time may be stored for future use. The estimated travel time may be transmitted via an electronic communication, such as an email, a text, a pop-up window, etc.

The flowchart of FIG. 5.2 may be varied. For example, the flowchart of FIG. 5.2 may include one or more modified blocks. The flowchart of FIG. 5.2 also may be modified by removing one or more blocks, or by adding additional blocks.

As an example variation, the flowchart of FIG. 5.2 also contemplates generating the estimated travel time when new roads are added to the private roads repository. Thus, for example, the flowchart of FIG. 5.2 may also include receiving a new road in the navigation service. The new road is along the route. The flow then also includes generating a vector data structure describing the new road, private roads, base roads, and ghost roads.

The flow then also includes predicting, by a machine learning model, a probability that the new road matches an existing road. The machine learning model may be, for example, an unsupervised clustering machine learning model; however, other machine learning model types are contemplated. The machine learning model takes, as input, the vector data structure. The machine learning model produces, as output, the probability.

The existing road with the highest probability of matching the new road is then substituted for the new road. In other words, the properties (e.g., segments, travel times, etc.) of the existing road are used in place of the unknown properties of the new road. The estimated travel time generated at block 510 for the new road is generated using the properties of the substituted existing road.

As indicated above, the flowchart of FIG. 5.2 may be implemented using aspects of the systems described with respect to FIG. 1.1 through FIG. 2. For example, the private roads repository (114) may be part of a first container (the private roads database and routing service (158)) including a first application programming interface (API) (124). The private roads in the private roads repository (114) may be in a first data format. An application programming interface (112) of the base roads engine (110) is a second API (112). The base roads engine (110) is part of a second container (the roads database and routing service (160)) that includes the second API (112). The ghost road may be a proxy of a base road route formed from one or more base roads stored in a base roads repository (108). The base roads engine (110) routes over public roads. The base roads stored in the base roads repository (108) are in a second data format heterogeneous to the first data format. In this case, sending the first request and receiving the replacement section in the flowchart of FIG. 5.2 are performed using the second API (112). Replacing the ghost road with the replacement section in the flowchart of FIG. 5.2 is performed using the first API (124).

Attention is now turned to FIG. 5.3. FIG. 5.3 shows a flowchart for presenting an estimated time of arrival and an estimated risk of delay in accordance with one or more embodiments. The flowchart of FIG. 5.3 is an alternative embodiment to the flowchart shown in FIG. 5.2.

Block 5000 includes performing route segmentation. Route segmentation is performed by outputting the intersections on a route from a route origin to a route destination. The segmentation may be performed as described with above with respect to the flowchart of FIG. 5.2.

Block 5020 includes performing map matching. Map matching is performed by matching historical data points of past trips by vehicles to a map. An example of map matching is shown in FIG. 6.8.

Map matching is performed by combining GPS recordings of vehicles on past trips within the radii of defined intersections, plus the GPS recordings of the vehicles along segments between the radii. In other words, when combined, the GPS recordings for the radii around the intersections and the GPS recordings for the segments match the historical data points of past trips to the map.

Details regarding map matching are now presented. The historical data points of past trips by vehicles may take the form of GPS recordings. The term "GPS" refers to "global positioning system." A GPS recording is data taken by a GPS receiver and then stored, possibly together with other information (e.g., a timestamp). Thus, for example, a GPS recording may be a point in space-time having a corresponding geographical position on the map at a particular time (i.e., as recorded by the timestamp). Multiple GPS recordings may be acquired using the GPS receiver at a predefined time interval (e.g., half a second, one second, twenty seconds, etc.).

The map, as indicated above, includes a route that is broken into segments. Each segment is represented by at least two intersections and a segment between the two intersections.

A radius is defined around an intersection point so that a vehicle passing through the intersection point has at least one GPS recording within the circle defined by the radius. To determine the appropriate radius, factors may be used, such a speed limit imposed on vehicles traveling the segments, masses of the vehicles, types of vehicles, etc. By using the factors, the distance that a vehicle can travel between GPS recording locations is calculated. That distance corresponds to the radius.

Defining the radius around an intersection is useful because the segments that compose the roads (e.g., the private roads from the private repository) may not be well-defined. Because the roads themselves may be estimations, it is initially unknown whether a vehicle will pass through a particular intersection point. The defined radius allows capture of information regarding the positions of vehicles relative to the estimated intersections. With a well-defined road system, such as in a city having only city/state paved roads, the passage by a vehicle on a particular road, when no other defined roads exist, indicates passage through an intersection. With undefined road system, determining that a vehicle passed through an intersection is not straightforward as other unknown intersections and unknown roads that are not known to the system may exist and because the road width may be unknown. Thus, by using a region defined by a radius, a heuristic is applied that a vehicle having at least one timestamp in the radius passed through the intersection.

The GPS recordings along a segment between intersections are then analyzed. GPS recordings within a pre-determined distance of a segment (i.e., GPS recordings between the circles defined for the two intersections, but have geographic positions along or near the segment connecting the intersections) are matched to the segment.

As stated above, map matching is performed by combining the GPS recordings within the radii and the GPS recordings along the segment. In other words, when combined, the GPS recordings for the radii around the intersections and the GPS recordings for the segments match the historical data points of past trips to the map.

The map matching may also include establishing and using an index. The GPS recordings are indexed according to the timestamps to form an index. The index may be limited or truncated. For example, a pre-determined number of indices may be used for the index, with the pre-determined number based on a frequency at which the recorded locations are recorded. By truncating the index, certain GPS recordings that are determined to be less reliable or otherwise undesirable may be removed from the map matching determination described above.

Block 5040 includes calculating a historical estimated time of arrival per segment. Calculating is performed by combining remaining timestamps for the remaining GPS recordings for a given segment and the associated intersections. For example, the timestamps for a set of GPS recordings for a pair of intersections and a segment may be summed together to calculate the historical estimated time of arrival for the segment. The process is repeated for each segment.

However, other combining techniques are contemplated. For example, combining also may be performed by, for each of the intersections, combining remaining timestamps for the remaining recorded locations by using a mean and plus or minus half of a standard deviation of timestamps for multiple trips by multiple vehicles. The mean and plus or minus half a standard deviation may be recorded as an inverse Gaussian distribution. The Gaussian distribution presents a range of time required to traverse a corresponding segment. The range of time is the average predicted travel time for each segment. An example of determining a range of times is shown with respect to FIG. 6.10.

Calculating the historical estimated time of arrival per segment may also include additional filtering of undesirable historical data points (i.e., GPS recordings), and then combining the remaining historical data points. Filtering the data may be performed by calculating distances between a corresponding intersection and global positioning system (GPS) points whose latitude and longitude values are within a pre-determined variance of a latitude and a longitude of a waypoint of the route. Filtering eliminates or reduces stray or incorrect GPS recordings, thereby increasing the accuracy of the final estimated time of arrival.

Filtering also may include discarding ones of GPS recordings whose corresponding timestamps are outside of a pre-determined number of indices in the index. In this manner, GPS recordings that are near each other in space, but not time, are discarded and remaining GPS recordings are used for determining the time to traverse a segment.

By discarding the ones of the GPS recordings whose corresponding timestamps are outside of a pre-determined number of indices in the index, GPS recordings of a single vehicle on a single trip are recorded. Discarding GPS recordings may be useful when a single vehicle goes back and forth on the same segment, when a single vehicle performs multiple trips over the same segment, or a single vehicle becomes lost and generates multiple GPS recordings within a segment when the vehicle is not following the path of the segment.

Filtering may also include weighting the data. For example, when calculating the historical estimated time of arrival per segment, the latest data (i.e., the more recent GPS recordings) receive higher weighting scores in the calculation. For example, the last three months of data may be valued more highly. The more in the past the GPS recordings, the less weight the GPS recordings have in contributing to the calculation of the historical estimated time of arrival per segment. An example of the filtering procedure is described with respect to FIG. 6.8 and FIG. 6.9.

Block 5060 includes calculating an estimated time of arrival given a route origin and a route destination. Block 5060 is performed when it is desired to estimate a time of arrival for a future trip by a vehicle.

Each time an estimated time of arrival is to be calculated between a route origin and a route destination, intersections of the route are acquired. The mean estimated time of arrival for each of the segments between each corresponding pair of intersection points are retrieved from the graph database. The range of variation for the estimated time of arrival is calculated using half of the overall standard deviations from the historical data (see FIG. 6.10).

However, determining the estimated time of arrival may need additional procedures when a segment between a route origin and the next intersection is not well defined, or similarly when a segment between the penultimate (second-to-last) intersection and the route destination is not well defined. (The segments between the first defined intersection and the penultimate intersection have stored values in a graph database, and thus are retrieved from the graph database, as described above).

The additional procedures begin with calculating a first estimated time from the route origin to the first intersection. The first estimated time may be determined by combining the timestamps for the GPS recordings matched to the map (at block 5020) between the route origin to the first intersection. Combining is described above with respect to block 5040.

Then, a final estimated time is calculated from the penultimate intersection to the route destination. The final estimated time may be determined by combining the timestamps for the GPS recordings matched to the map (at block 5020) between the penultimate intersection and the route destination. Combining is described above with respect to block 5040.

The estimated time of arrival between the route origin and the route destination is the combination of the estimated times described above. Thus, for example, the estimated time of arrival is the sum of the estimated times for the segments as retrieved from the graph database, plus the first estimated time from the route origin to the first intersection, plus the final estimated time from the penultimate intersection and the route destination.

Block 5080 includes estimating a risk of delay. Knowing the risk of delay can mitigate undesirable demurrage that may result due to an unexpectedly long delay in a trip. Estimating the risk of delay may be performed using a machine learning model, as described below.

In one or more embodiments, information is gathered for a route or route segment. The information may include metadata for recorded trips, data indicating whether a shipment on a route is an outlier in terms of delay, and data indicating travel time for a shipment. The information also includes delay information for trips where a delay occurred.

A vector generator encodes the information into a vector. The encoding may be a direct encoding (e.g., the information is added to the corresponding entry in the vector) or indirect encoding (e.g., a mapping function is applied to the information and the output of the mapping function is added to the vector). A machine learning model is then executed on the vector to classify the delays in shipments. The delays may be classified based on length of delay, whether a delay resulted in demurrage, the type of vehicle involved with a delay, a mass of vehicle involved with a delay, and possibly other classifications.

During training of the machine learning model, a loss function may be applied to the output risk of delay and the actual delay to generate a loss. The loss is backpropagated through the machine learning model to adjust the weights of the machine learning model. Through training, the machine learning model learns the amounts that entries (and corresponding information) contribute to a risk of delay.

Machine learning may also be used to estimate the estimated time of arrival and risk of delay over new segments that are not yet part of the historical data in the graph database. For the segments that were not driven before, an unsupervised clustering machine learning algorithm may be used to group similar road segments.

Some of the features used in the vector that is input to the machine learning model may include, but are not limited to a length of the road, a pavement type, a direction of travel, a geographical position, a season of the year, etc. The machine learning model clusters the road segments from the past along with the new, unconfirmed road using the features. Thus, the new, unconfirmed route segment is compared to and clustered with existing route segments for which historical delay information is known. Thus, the average historical delay information from a particular cluster can be applied to the new route segment. In particular, the ETA and risk delay for the new route segment may be assigned the average ETA and risk delay values for the cluster.

Attention is returned to the outliers mentioned, above, as being part of the metadata or data encoded in the vector. A shipment has a predicted ETA distribution and an ATA (actual time of arrival). If the ATA is within the bounds of 95% of ETA distribution, the ETA criteria is deemed met and the shipment is an "inlier". If the ATA is outside of the bounds of 95% of distribution, it is considered an "outlier".

Each shipment, regardless if an "outlier" or "inlier," has metadata associated with it. The metadata includes one or more of a type of load, a weight of load, a vehicle class, weather conditions while driving, a time of day, a region of the map, a road class on the route, etc. Using the metadata as predictors, the machine learning algorithm can predict the probability a shipment will become an "outlier". The "outlier" prediction further can be used in logistics optimization risk management to introduce premiums on high risk shipments, or to increase the reliability of logistics by managing maximum acceptable risk.

Block 5100 includes presenting an estimated time of arrival and estimated risk of delay. The estimated time of arrival and estimated risk of delay may be presented by display on a graphical user interface. The estimated time of arrival and estimated risk of delay may also be presented by other techniques, such as but not limited to provision to another software application, presentation in a pop-up window, transmission in an electronic communication, etc.

FIGS. 6.1-6.5 shows an example in accordance with one or more embodiments of the technology. The following example is for explanatory purposes and not intended to limit the scope of the technology.

Geocoding may be performed by both base service and private information. For example, base geocoding is done by different services such as Google Places. Many governmental regulations for different states in United States mandates that wells and well permits are reported to government database. The government database of well locations may be augmented with existing geocoding from Google places API and receive the combination of "Base"+"Oilfield" locations. The data may further be augmented with private databases of geocoded location information. The databases are replaceable and usable in a sense of easiness of application, it should be replaceable and callable from one generalized service. Thus, different databases may be used for geocoding for different regions.

Another component is having a private roads data repository of available roads for driving. The private roads data repository may include roads from different data sources. As a previous example with the various locations databases, the roads databases may be generalizable, interchangeable and infinitely scalable. For example, the private roads repository may include identified roads from various sources, user validated, and crowdsourced roads.

FIGS. 6.1-6.5 shows an example in accordance with one or more embodiments of the technology. Turning to FIG. 6.1, FIG. 6.1 shows a map having base roads (denoted with thinner lines) from a base roads repository and private roads (denoted with thick black lines) from a private roads repository. The base roads service provides a Directions API for the base roads.

By studying satellite photos, GPS breadcrumbs and other data sources, the missing roads (i.e., private roads are identified). When the private roads are added to the private roads repository, base road intersection points are marked on the private roads. The base roads intersection points are marked as points 1, 2, 3, and 4 in FIG. 6.2. below. The four intersection points are referred to as four points base road intersection points.

Note that the private roads and base roads are stored in separate, independent data repositories.

Next one or more embodiments iterate the combinations of base road intersection points and use the base service to calculate the travel time and distance for each pair shown as dotted lines in FIG. 6.3. The values are saved as a set of ghost roads in the private roads repository, and the travel times and distances are assigned to the ghost roads. Because of one-way roads and other constraints, order is maintained. Thus, the travel time from 1 to 2 may not be the same as from 2 to 1. Thus, the private roads repository includes the time and distance it to travel between any pair of base road intersection points.

Running the script that builds ghost roads between combinations of base road intersection points engages into an n*(n−1) loop through the base road intersection points and query the directions for combinations of base road intersection points. Each combination is saved as a straight road as a ghost road in the private road database with the correct time/distance/routing value. The dashed lines of FIG. 6.3 are the ghost roads. Since a combination of n(n−1) base road intersection points pairs are created, the system is scalable is if decomposed, solved in chunks and rebuilt with connecting the base road intersection points on polygon connections.

Next, consider the scenario in which the navigation service is called. For the navigation service, the navigation service may include 1. Creating a path; 2. Validating the drivability of the path; 3. Optimization of the route based on drivability and ETA.

To create a path, depending on a number of containers involved in route creation and geospatial locations of roads algorithm might have slight modifications in logics. For the purposes of an example, consider that two data repositories exist (i.e., the base roads repository; and the private roads repository).

The data structure is used to calculate routes, ETAs, distance, time etc. Turning to FIG. 6.4, consider the scenario in which the route origin is selected as A and the route destination is B. The private roads repository may be used to calculate the optimal path according to the weighting selected. For example, the private roads repository may calculate the thick dotted path in FIG. 6.5. Next, the thick dotted path is traversed to identify road segments that are actually a ghost road and not a private road. The base roads service is queried using the base road intersection points (i.e., point 2 and point 3) at either end of the ghost road as the origin and destination.

The resulting section is substituted into the route to replace the ghost road as shown in FIG. 6.6. The thick dotted path in FIG. 6.6 shows the resulting route that is presented.

In one or more embodiments, the interface may have the following to serve a directions request. When handling a 'directions' request, several scenarios may exist that use different approaches. The first is to identify whether the start and/or destination is on a private road or on a base road.

The following are example scenarios to address. In the first scenario, both start and destination are on private road segments. In such a scenario, the private roads repository may be used to get the complete route. The complete route is traversed, and any road segment found is marked as 'ghost road'. The segments are substituted with requests to the base service.

A second scenario is that both the start and destination are on base roads. In such a scenario, the directions from the base service may be queried and the base roads repository may be used. This implies that the algorithm will not utilize potential shortcuts from the private roads repository.

A third scenario exists when an endpoint is on base road, and the other endpoint is on private road. In such a scenario, a route from the private endpoint to a 'reasonable' base road intersection point is identified. For example, N nearest base road intersection points using basic straight-line distance. Based on the nearest intersection points, actual routing cost from endpoint to the intersection points are calculated and the optimal route is selected. The optimal base road intersection point may be selected based on the route between the endpoint and the base road intersection points can lead to a sub-optimal overall route.

Another technique when at least one endpoint is on a base road is to have the endpoint stored as a small private road, and just an intersection point. Such technique may be used, for example, when the endpoint is used with a threshold frequency as an endpoint to a route.

In some embodiments, drivability of private roads is validated. Tracking information of the shipments of vehicles driven any location in the world may be stored. The tracking information may include 1. Type of vehicle (light or heavy)—gives the size of the road and applicability for the user's vehicle; 2. Average driving speed. —used to estimate ETA of any given shipment; 3. Direction of the driving. —used to determine one way or two-way roads. Note: the fact of slowdown at particular location when two vehicles meet indicates a narrow road. Other tracking information may be stored. For example, predictors such as weight of the load, type of the load, season and day/time driven, experience of the driver, age, gender etc. can be used to classify drivability and weight the level of confidence for the road suggestion engine.

The route may be optimized based on drivability and estimated time of arrival. From average driving speed, ETA may be estimated. A machine learning algorithm that uses the predictors such as weight of the load, type of the load, season and day/time driven, experience of the driver, age, gender etc. can be used to predict estimated time of arrival and give uncertainty ranges according to the algorithm. Usage of the ETA will increase confidence in shipment and operations planning.

Tile component is a visual representation of the map and front end for the routing algorithm.

An example use of the application is an oilfield route suggestion. However, the concept is generalizable for any given place/technology in the world. Such industries include Oilfield, Agriculture, Mining, National parks etc. as an API. Having a reliable API/service to produce ETAs and driving instructions across previously unmapped road networks will enable a series of dependent systems around logistics planning, resource optimization and obviously self-driving trucks.

FIG. 6.7 shows an example of segmenting a route and determining estimated times of arrival for each segment based on historical data, in accordance with one or more embodiments. The example of FIG. 6.7 may be performed after the procedures described with respect to one or more of FIG. 6.1 through FIG. 6.6.

The route origin is selected as A and the route destination is B. As described with respect to FIG. 6.6, the private roads repository may be used to calculate the optimal path according to the weighting selected. The path is then broken into segments, such as segment (600) or segment (602). Each segment is defined between two intersections, which may also be referred-to as waypoints. Thus, for example, segment (600) is defined between intersection (604) and intersection (606). Similarly, segment (602) is defined between intersection (608) and intersection (610).

GPS recordings are collected or retrieved along each of the segments at pre-determined time intervals. The GPS recordings relate to one or more vehicles traveling along the segments in the past. A GPS recording contains a location of a vehicle and a timestamp setting the time that the vehicle was at that location. A GPS recording may also be associated with metadata. The metadata may be any of the forms of metadata described above with respect to FIG. 5.2 or FIG. 6.7. The GPS recordings include, for example, GPS recording (612) and GPS recording (614) in segment (600), or GPS recording (616) and GPS recording (618) in segment (602).

The GPS recordings and the metadata are recorded in a graph database. An example of a graph database is shown in FIG. 6.11. The nodes of the graph database are the intersections. The edges contain the GPS recordings and/or the metadata, and also indicate the relationships between the nodes.

For each segment, the GPS recordings may be combined (e.g., processed according to the procedures described with respect to FIG. 5.2) in order to establish an estimated time of travel along each segment. The estimated time of travel is stored in the graph database.

At runtime, when a new vehicle is planning a new trip between the route origin, A, and the route destination, B, the route is broken into the segments defined by the intersections along the route. The average travel times of the segments is then retrieved from the graph database, and then combined in order to establish an overall estimated travel time. The overall estimated travel time can then be used to establish the estimated time of arrival.

Additional predictions may also be generated, such as described above with respect to FIG. 5.2 and FIG. 5.3. The additional predictions may also include an estimated delay risk, a risk of demurrage, etc.

FIG. 6.8 and FIG. 6.9 provide additional examples of treating and filtering the GPS recordings described with respect to FIG. 6.7, as described with respect to block 5020 of FIG. 5.3. In particular, FIG. 6.8 is provided as an example of map matching described with respect to FIG. 5.3, in the context of the route segments shown in FIG. 6.7 In turn, FIG. 6.9 is provided as an example of calculating the historical estimated time of arrival per segment at block 5040 of FIG. 5.3, in the context of the route segments shown in FIG. 6.7. Thus, reference numerals common to FIG. 6.7 through FIG. 6.9 refer to similar objects that have similar properties.

Referring to FIG. 6.8, the route from route origin to route destination was broken into segments, as described with respect to FIG. 6.7. The segments, such as segment (600), were defined as the portions of the road between two intersection points, such as intersection (604) and intersection (606). GPS recordings, such as GPS recording (612) and GPS recording (614) are recorded along the segment (600).

A threshold radius is selected around the intersections. Thus, threshold radius (620) is selected for intersection (604) and threshold radius (622) is selected for intersection (606). The threshold radius is used to ensure historical GPS recordings passing through a given intersection are captured.

The threshold radius may be calculated taking into consideration the speed limit for vehicles on the road segments, as well as the time interval that the GPS recordings are recorded on an average. For example, if the speed limit is 75 miles per hour (34 meters per second) and the GPS recordings are recorded at twenty second intervals, then a threshold radius may be a diameter of 680 meters (34×20). In this manner, at least one GPS recording will be captured per road segment per vehicle.

To know if a GPS recording was in the threshold radius, a geodesic distance may be calculated between each GPS recording and an intersection point. If the distance traveled by a vehicle was less than the geodesic distance, then a vehicle is considered to have passed through the corresponding intersection point.

Attention is now turned to FIG. 6.9. Again, FIG. 6.9 is provided as an example of calculating the historical estimated time of arrival per segment at block 5040 of FIG. 5.3, in the context of the route segments shown in FIG. 6.7. As with FIG. 6.8, segment (600) is defined between intersection (604) and intersection (606). GPS recordings, such as GPS recording (624), GPS recording (612), and GPS recording (614) are also shown.

Once the GPS recordings passing through an intersection are mapped to the intersection, the trips passing through both of a pair of adjacent intersection points are identified. Difference are then taken between the timestamps of the trips (e.g., the timestamps for GPS recording (612), GPS recording (614), GPS recording (624) and any other GPS recordings in the segment (600)). In this manner, the historical estimated time of arrival per segment can be calculated.

However, FIG. 6.9 also highlights the challenge when there are multiple readings for the same trip at an intersection. For example, it is possible for a vehicle to go back and forth along the segment (600), and thus present multiple GPS recordings for the same trip on a segment where one such GPS recording is desirable.

The GPS recordings in FIG. 6.9 are for one particular trip. The different shades represent instances of one cycle of retracing. Thus, for example, GPS recording (612), GPS recording (614), and GPS recording (624) represent different GPS recordings on different cycles of retracing, as the GPS recordings are of different shades.

In order to sequentially map the same trip's timestamps between the intersections, and to avoid having different trips mapped into a timestamp, the GPS recordings are indexed in sequence. The timestamp at the first index for a trip at an intersection point is considered the first set of true values. Any index beyond a difference of a pre-determined number of indexes from the first index is considered an instance of retracing, or a different trip.

A difference in timestamps is determined if the indices of the timestamps from adjacent intersections are within a pre-determined number of indexes (e.g., 15, 20, 30 indices). The pre-determined number of indices is determined by the distance between intersections, a minimum speed recorded on the roads, and a frequency of GPS recording acquisition. The minimum difference in indices that allows one to capture the same trip is used to differentiate one trip from another. Thus, lost vehicles or vehicles going back and forth on the same segment may be resolved and accounted for by removing GPS recordings beyond the pre-determined number of indices for a trip.

Filtering may also be applied to remove GPS recordings that are outliers. For example, the GPS recording data may be filtered to calculate the distance between the intersection and those GPS recordings whose latitude and longitude values are within a coordinate threshold (i.e., +/−0.004) of the latitude and longitude of the intersection point. The coordinate threshold is shown as box (626) and box (628) in FIG. 6.8

Attention is now turned to FIG. 6.10. FIG. 6.10 shows an example of Gaussian distributions of estimated travel times for a segment, such as segment (600) in FIG. 6.7 through FIG. 6.9.

Using a vehicle's distance to check the fit of the known distributions with delta timestamps data, inverse Gaussian distributions are displayed in FIG. 6.10. The inverse Gaussian distributions include distribution (650), distribution (652), and distribution (654). The inverse Gaussian distributions are selected to represent the data variation between different shipments through the adjacent points of the intersections. For example, in one of the final ETA calculations, the mean and plus or minus half the standard deviation are used as the range of times required to traverse the segment (600). The selected values statistically contain about forty percent of past data in the segment (600). The remaining sixty percent of past data in the segment (600) is discarded or filtered, as described with respect to FIG. 5.3.

Attention is now turned to FIG. 6.11. FIG. 6.11 shows an example of a graph database (670). The graph database (670) contains a number of nodes, such as node (672) and node (674). The nodes represent intersections in FIG. 6.7 through FIG. 6.9. The nodes are connected by edges, such as edge (676). The edges represent segments between the intersections. The edges store additional data that define the relationships between the nodes. For example, the additional information may be weights that contain relevant information on the distributions of time estimates, such as the location and scale of the distributions.

In order to account for the differences in bidirectional traffic flow on each segment, as described with respect to FIG. 6.9, the graph database (670) may be a bidirectional graph network. A bidirectional graph network is a graph database, but the edges are directional. In other words, two segments connect each node, one segment from node (674) to node (672), and another segment from node (672) to node (674). Information relating to the direction of travel between the two nodes may be stored in the respective segments connecting the two nodes.

Attention is now turned towards a method of building the graph database (670). The process of building the graph database (670) may include storing a subset of the segments as edges and storing intersections between the segments as nodes. At least some of the edges connect at least some of the nodes. One or more intersections connect the segments. For each of the intersections, recorded locations of the vehicles are captured from data including a total number of recorded locations of a set of vehicles. The recorded locations for a corresponding intersection are within a corresponding defined radius around the corresponding intersection.

Timestamps are recorded for the recorded locations. The recorded locations are indexed according to the timestamps to form an index. Remaining recorded locations are formed by discarding ones of the recorded locations whose corresponding timestamps are outside of a pre-determined number of indices in the index. Building the graph database thus includes storing the recorded locations, the timestamps, the remaining recorded locations, and the estimated travel time as part of the edges of the graph database.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform at least a portion of one or more embodiments of the technology.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7.1 and the nodes and/or client device in FIG. 7.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method comprising:
generating, by a navigation service, a route for navigating from a route origin to a route destination using a private roads repository;
identifying a ghost origin and a ghost destination of a ghost road along the route, wherein the ghost road is a proxy road for one or more base roads in a base roads repository and the ghost origin and the ghost destination each correspond to a location where a private road intersects a base road;
sending, using an application programming interface of a base roads engine, a first request for a route from the ghost origin to the ghost destination;
receiving, from the base roads engine in response to the first request, a replacement section from the ghost origin to the ghost destination;
replacing, in the route from the route origin to the route destination, the ghost road with the replacement section to create an updated route comprising a plurality of segments, wherein the replacement section is obtained from the base roads repository via the application programming interface;
generating, using distances and travel times returned by the application programming interface, an estimated travel time from the route origin to the route destination over the plurality of segments of the updated route;
transforming a plurality of metadata describing a vehicle type of a vehicle using the updated route into a vector data structure, wherein the vehicle type identifies a physical size of the vehicle;
predicting, by an unsupervised clustering machine learning model taking as input the vector data structure, a probability of delay for the vehicle type;
estimating a predicted delay from the probability of delay for the vehicle type; and
presenting, on a display, the predicted delay together with the estimated travel time.

2. The method of claim 1, wherein a plurality of intersections connect the plurality of segments, and wherein the method further comprises:
capturing, for each of the plurality of intersections from data comprising a total number of recorded locations of a plurality of vehicles, a plurality of recorded locations of the plurality of vehicles,
wherein the plurality of recorded locations for a corresponding intersection are within a corresponding defined radius around the corresponding intersection, and
wherein the corresponding defined radius is determined according to a combination of masses of the plurality of vehicles and corresponding speed limits over the plurality of segments.

3. The method of claim 1, wherein a plurality of intersections connect the plurality of segments, and wherein the method further comprises:
capturing, for each of the plurality of intersections from data comprising a total number of recorded locations of a plurality of vehicles, a plurality of recorded locations of the plurality of vehicles,
wherein a plurality of timestamps are recorded for the plurality of recorded locations;
indexing the plurality of recorded locations according to the plurality of timestamps to form an index;
forming remaining recorded locations by discarding ones of the plurality of recorded locations whose corresponding timestamps are outside of a pre-determined number of indices in the index that differentiates one trip from another trip.

4. The method of claim 3 wherein, by discarding the ones of the plurality of recorded locations whose corresponding timestamps are outside of the pre-determined number of indices in the index, global positioning system (GPS) recordings of a single vehicle on multiple trips through a single intersection are discarded.

5. The method of claim 3, wherein the pre-determined number of indices is determined based on a frequency at which the plurality of recorded locations are recorded.

6. The method of claim 1, wherein a plurality of intersections connect the plurality of segments, and wherein the method further comprises:
capturing, for each of the plurality of intersections from data comprising a total number of recorded locations of a plurality of vehicles, a plurality of recorded locations of the plurality of vehicles; and
filtering the data by calculating distances between a corresponding intersection and global positioning system (GPS) points whose latitude and longitude values are within a pre-determined variance of a latitude and a longitude of a waypoint of the updated route.

7. The method of claim 1, wherein a plurality of intersections connect the plurality of segments, and wherein the method further comprises:
capturing, for each of the plurality of intersections from data comprising a total number of recorded locations of a plurality of vehicles, a plurality of recorded locations of the plurality of vehicles,
wherein the plurality of recorded locations for a corresponding intersection is within a corresponding defined radius around the corresponding intersection, and
wherein a plurality of timestamps are recorded for the plurality of recorded locations;
indexing the plurality of recorded locations according to the plurality of timestamps to form an index;
forming remaining recorded locations by discarding ones of the plurality of recorded locations whose corresponding timestamps are outside of a pre-determined number of indices in the index that differentiates one trip from another trip;
generating a corresponding average predicted travel time for each segment by, for each of the plurality of intersections, combining remaining timestamps for the remaining recorded locations; and
generating the estimated travel time by combining the corresponding average predicted travel time for each segment.

8. The method of claim 7, wherein generating the corresponding average predicted travel time for each segment by, for each of the plurality of intersections, combining the remaining timestamps for the remaining recorded locations further comprises:
using a mean and plus or minus half of a standard deviation of timestamps, recorded as an inverse Gaussian distribution, as a range of time required to traverse a corresponding segment, wherein the range of time comprises the corresponding average predicted travel time for each segment.

9. The method of claim 1, wherein:
the private roads repository is part of a first container comprising a first application programming interface (API), private roads in the private roads repository comprise a first data format, the application programming interface of the base roads engine is a second API, the base roads engine is part of a second container that includes the second API, the base roads engine routes over public roads, the base roads stored in the base roads repository comprise a second data format heterogeneous to the first data format, sending the first request and receiving the replacement section are performed using the second API, and replacing the ghost road with the replacement section is performed using the first API.

10. The method of claim 1, further comprising:

receiving a new road in the navigation service, wherein the new road is along the route;

generating a second vector data structure describing the new road, private roads, base roads, and ghost roads;

predicting, by a second unsupervised clustering machine learning model taking as input the second vector data structure, a probability that the new road matches an existing road;

wherein generating the estimated travel time includes substituting the existing road for the new road.

11. The method of claim 1, wherein generating the estimated travel time comprises:

querying a graph database storing a subset of the plurality of segments as edges and storing intersections between the plurality of segments as nodes, wherein at least some of the edges connect at least some of the nodes; and determining, by combining data in the edges, the estimated travel time.

12. The method of claim 1, wherein generating the estimated travel time comprises:

querying a graph database storing a subset of the plurality of segments as edges and storing intersections between the plurality of segments as nodes, wherein at least some of the edges connect at least some of the nodes; and determining, by combining historical data of past trips over the plurality of segments, the estimated travel time, wherein the historical data is stored in the edges, wherein combining further includes weighting the historical data based on a vehicle type of a vehicle using the navigation service, and wherein the weighting is performed using weights associated with vehicle types as stored in the edges.

13. The method of claim 12, further comprising scaling the weights over time.

14. The method of claim 1, wherein generating the estimated travel time comprises:

querying a graph database storing a subset of the plurality of segments as edges and storing intersections between the plurality of segments as nodes, wherein at least two of the edges connect to each node to represent a bidirectional traffic flow for each of the plurality of segments;

identifying a direction of travel along the plurality of segments using the edges; and determining, by combining data in the edges in the direction of travel, the estimated travel time.

15. The method of claim 1, wherein generating the estimated travel time comprises:

querying a graph database storing a subset of the plurality of segments as edges and storing intersections between the plurality of segments as nodes, wherein at least some of the edges connect at least some of the nodes;

estimating a first travel time between the ghost origin and a first node in the nodes;

estimating a final travel time between the ghost destination and last node in the nodes;

estimating an intermediate travel time along the subset of the plurality of segments using data in the edges; and determining, by combining the first travel time, the final travel time, and the intermediate travel time, the estimated travel time.

16. The method of claim 1, further comprising:

building a graph database by storing a subset of the plurality of segments as edges and storing intersections between the plurality of segments as nodes, wherein at least some of the edges connect at least some of the nodes; and determining, by combining data in the edges, the estimated travel time.

17. The method of claim 16, wherein a plurality of intersections connect the plurality of segments, and wherein the method further comprises:

capturing, for each of the plurality of intersections from data comprising a total number of recorded locations of a plurality of vehicles, a plurality of recorded locations of the plurality of vehicles, wherein the plurality of recorded locations for a corresponding intersection is within a corresponding defined radius around the corresponding intersection, and wherein a plurality of timestamps are recorded for the plurality of recorded locations;

indexing the plurality of recorded locations according to the plurality of timestamps to form an index;

forming remaining recorded locations by discarding ones of the plurality of recorded locations whose corresponding timestamps are outside of a pre-determined number of indices in the index;

generating a corresponding average predicted travel time for each segment by, for each of the plurality of intersections, combining remaining timestamps for the remaining recorded locations; and generating the estimated travel time by combining the corresponding average predicted travel time for each segment, wherein building the graph database further comprises storing the plurality of recorded locations, the timestamps, the remaining recorded locations, and the estimated travel time as part of the edges of the graph database.

18. A system comprising:

a private roads repository storing a plurality of private roads and a ghost road, wherein the ghost road is a proxy road for one or more base roads;

a navigation service, executing on a computer processor, operatively connected to the private roads repository and configured to perform operations comprising:

generating, by a navigation service, a route for navigating from a route origin to a route destination using the private roads repository;

identifying a ghost origin and a ghost destination of a ghost road along the route, wherein the ghost origin and the ghost destination each correspond to a location where a private road intersects a base road;

sending, using an application programming interface of a base roads engine, a first request for a route from the ghost origin to the ghost destination;

receiving, using the application programming interface, from the base roads engine in response to the first request, a replacement section from the ghost origin to the ghost destination;

replacing, in the route from the route origin to the route destination, the ghost road with the replacement section to create an updated route comprising a plurality of segments, wherein the replacement section is obtained from the base roads repository via the application programming interface;

generating, using distances and travel times returned by the application programming interface, an estimated travel time from the route origin to the route destination over the plurality of segments of the updated route;

transforming a plurality of metadata describing a vehicle type of a vehicle using the updated route into a vector data structure, wherein the vehicle type identifies a physical size of the vehicle;

predicting, by an unsupervised clustering machine learning model taking as input the vector data structure, a probability of delay for the vehicle type;

estimating a predicted delay from the probability of delay for the vehicle type; and presenting, on a display, the predicted delay together with the estimated travel time.

19. The system of claim 18, wherein the system further comprises:

a graph database storing a subset of the plurality of segments as edges and storing intersections between the plurality of segments as nodes, wherein at least some of the edges connect at least some of the nodes, and wherein the operations further comprise:

determining, by combining data in the edges, the estimated travel time.

* * * * *